US010153901B2

(12) United States Patent
Thackston

(10) Patent No.: US 10,153,901 B2
(45) Date of Patent: Dec. 11, 2018

(54) SYSTEM AND METHOD FOR VERIFYING USER IDENTITY IN A VIRTUAL ENVIRONMENT

(71) Applicant: Concierge Holdings, Inc., Pinellas Park, FL (US)

(72) Inventor: James D. Thackston, Pinellas Park, FL (US)

(73) Assignee: CONCIERGE HOLDINGS, INC., St Petersburg, FL (US)

(*) Notice: Subject to any disclaimer, the term of this patent is extended or adjusted under 35 U.S.C. 154(b) by 0 days.

(21) Appl. No.: 14/880,647

(22) Filed: Oct. 12, 2015

(65) Prior Publication Data
US 2016/0036588 A1 Feb. 4, 2016

Related U.S. Application Data

(63) Continuation-in-part of application No. 13/303,667, filed on Nov. 23, 2011, now Pat. No. 9,159,187.

(60) Provisional application No. 62/114,938, filed on Feb. 11, 2015, provisional application No. 61/416,526, filed on Nov. 23, 2010.

(51) Int. Cl.
H04L 9/32 (2006.01)
H04L 29/06 (2006.01)
H04L 9/08 (2006.01)
G07F 17/32 (2006.01)

(52) U.S. Cl.
CPC .......... *H04L 9/321* (2013.01); *G07F 17/3206* (2013.01); *G07F 17/3241* (2013.01); *H04L 9/083* (2013.01); *H04L 9/3231* (2013.01); *H04L 63/0838* (2013.01); *H04L 63/0861* (2013.01); *H04L 63/102* (2013.01)

(58) Field of Classification Search
USPC ....................... 705/64, 65; 726/2, 3
See application file for complete search history.

(56) References Cited

U.S. PATENT DOCUMENTS

| 7,181,017 | B1 | 2/2007 | Nagel et al. |
| 7,869,591 | B1 | 1/2011 | Nagel et al. |
| 8,296,573 | B2* | 10/2012 | Bolle ....................... G06F 21/32 713/186 |
| 8,316,237 | B1 | 11/2012 | Felsher et al. |
| 2009/0276860 | A1* | 11/2009 | Miyabashi .......... G06F 21/6245 726/30 |
| 2012/0191614 | A1* | 7/2012 | Babitch ............. G06Q 20/3829 705/71 |
| 2013/0347117 | A1* | 12/2013 | Parks ...................... H04L 63/08 726/26 |
| 2015/0186871 | A1* | 7/2015 | Laracey ............. G06Q 20/3278 705/41 |
| 2015/0304318 | A1* | 10/2015 | Delsuc ................ H04L 63/0815 726/7 |

(Continued)

OTHER PUBLICATIONS

NIST Special Publication 800-157, Dec. 2014.

Primary Examiner — Tsan-Yu J Huang
(74) Attorney, Agent, or Firm — Tanner IP, PLLC

(57) ABSTRACT

Systems and methods for verifying user identity in a virtual environment are provided that may include the use of a trusted third party to perform identity verification. Devices may be configured such that the device is unalterably bound to a particular user via biometric data stored on the device and/or with the third party.

18 Claims, 15 Drawing Sheets

(56) References Cited

U.S. PATENT DOCUMENTS

2016/0036588 A1* 2/2016 Thackston .............. H04L 9/321
                    713/168

* cited by examiner

SYSTEM AND METHOD FOR VERIFYING USER IDENTITY IN A VIRTUAL ENVIRONMENT

CROSS-REFERENCE TO RELATED APPLICATIONS

The present application claims priority under 37 CFR § 1.78(a) to U.S. Provisional Application No. 62/114,938 filed Feb. 11, 2015, and is a continuation-in-part of U.S. application Ser. No. 13/303,667, filed Nov. 23, 2011, and issued as U.S. Pat. No. 9,159,187 on Oct. 13, 2015, which claims priority under 37 CFR § 1.78(a) to U.S. Provisional Application 61/416,526, filed Nov. 23, 2010, the contents of all of which are hereby incorporated by reference in their entireties.

BACKGROUND OF THE INVENTION

The internet cybercrime problem can be illustrated by comparing cyber security to sports. In any sport, individuals or teams compete in a game with rules. Without exception, sporting events from baseball to the Olympic Games require a 3rd party to act as an independent arbitrator, ensuring that the rules of the game are enforced.

When managers of highly sensitive government networks, financial institution websites, electronic health records (EHR) contractors, or online retailers allow employees or customers access to their cyber infrastructure, the relationship is naturally adversarial in a way similar to a sporting event. In order for a computer network controller to grant an employee access to a remote workstation, the employee must confirm their identity by using a password, biometric scan, or 2-factor login procedure. The network controller and employee are, at the moment of the identity verification, opponents on a cyber-playing field. The missing element in this scenario is an independent 3rd party to act as a 'referee.'

Of the current methods used for online identity verification, passwords are by far the weakest. Alternatives to passwords include Kerberos 2-factor authentication and conventional biometric methods integrated into modern smartphones and other computing devices (e.g. Apple iPhone 5S™). Neither of these methods are completely trustworthy since the 2 factors or the smartphone can be transferred to another person without the knowledge of computer network administrators granting access privileges or internet websites requiring identity verification. Even though a smartphone uses biometric methods, the original owner of the device may choose to reset or be coerced into resetting the device's biometric reference to that of another person.

Another problem is illustrated by recognizing that a secure computing device (e.g. smartphone) might be lost and then found by a skilled technician who might disassemble the device and compromise any sensitive data stored inside.

Presently, cybersecurity of EHRs is less robust than consumers might expect. One problem is the state of EHRs when they are in storage 'at rest' and in transit. Encryption is used but the owner of the keys used to encrypt this data is typically not the person (patient) to whom the EHRs belong.

With online payments, consumers are sometimes frustrated by burdensome procedures involved in cancelling services which are paid from credit cards or other financial accounts at regular, recurring intervals. Sometimes, a recurring draw against an account occurs due to fraud or by mistake.

Finally, younger citizens are typically much more technology savvy than previous generations and prefer to conduct much of their personal business through online means. Online voting in political elections is no different. Some theorize that low voter participation by younger citizens is due in part to the trouble of having to travel to a physical location to cast an in-person vote. Online voting is one of many cases where reliable proof of identity at the moment of action is vital. Online voting cannot emerge without a comprehensive solution to fraud-proof identity verification.

The ability of criminals and cyber-terrorists to infiltrate supposedly well-defended computer networks is well known. In order to successfully breach cyber defenses, criminals or terrorists must execute actions against computer hardware and software that is typically under the complete control of third parties which may include innocent individuals, businesses, or government agencies. As a result, billions of dollars are spent on countermeasures and recovery from breaches.

Less widely recognized problems are also inherent in other online activities, such as those that involve wagering, and other transfers of funds between individuals, such as may occur in online versions of poker, etc.

By way of example, in internet poker, 2 to 10 people typically play each other across a 'virtual' poker table. The game is managed from servers operated by an internet poker service provider (or 'poker website'). The poker website manages communications to and from remote computers that are under the near complete control of the players. It is on the graphical displays of these remote computers that the virtual poker table, avatars for other players, and card graphics are made visible to the player. For innocent players the fact that they control their own computers is of no consequence. But if the 'player' as known to the poker website and its regulators is a 'money mule' paid by a terror or crime organization (TCO), a significant vulnerability is apparent. A 'money mule' is a person hired by a TCO for his or her unblemished identity and separation from the TCO.

Contrast the problem faced by hackers trying to break into computers under the control of someone else, to that faced by a TCO hacking computers entirely under its control. Manipulation of, for example, internet poker games for the purpose of laundering money becomes astonishingly easy.

Consider a criminal enterprise (CE) seeking to offer untraceable electronic banking services to terror and crime organizations (TCOs). The CE uses technology and carefully-designed business processes to exploit the natural properties of internet poker in order to move vast sums of money among thousands of poker accounts in many different countries. The most basic operation performed by the CE is the corruption of internet poker games using 4-way collusion for the purpose of moving money from two poker accounts to two other poker accounts playing at the same virtual poker table.

Regulators in jurisdictions where internet poker is legal such as the Isle of Man, the Alderney Islands, and Gibraltar claim that by recording hand histories and the identities of the players at any virtual poker table, counter-terrorism investigators can determine connections between donors and recipients. They also claim that it is possible to determine the physical location (geo-location) of an online poker player. They further claim that automated anti-collusion detection systems can reliably find instances where two or more players are sharing card values. The fact is, the CE can breach any anti-collusion or global positioning system (GPS) or internet protocol (IP) address geo-location system currently used by internet poker websites.

The following scenario illustrates just one example of how the CE might use weaknesses in the current internet poker business model to implement a large scale money laundering operation. However, it should be appreciated that the concepts described herein are applicable to a wide variety of online activities in which the actual identity and/or location of a user is needed for verification, tracking and/or monitoring purposes.

The CE business process assigns any number of 'money mule' accounts to poker games in groups of four. This means that 4 of the 9 to 10 seats at a compromised virtual poker table are CE mule accounts. The mules never actually play the games and may not even be privy to the CE's activities. Experts at CE remotely login to the mules' computers and play games under the identities of those mules. They can also transfer money to and from the mule bank accounts and read emails sent to the mules by the poker website.

For typical money transfers, two of the mule accounts are designated as donors and two are recipients. The CE 'players' use technology that allows them to see each others hole cards in an undetectable manner that does not distract from the game in any way. The players can remain focused on the game ensuring, over time, that money moves in the right direction.

Further, specially-designed software used by the CE to generate the four-player games can easily and reliably defeat any automated anti-collusion technique employed by the poker websites or their regulators. This is done by providing each mule with two low-end computers. One computer is 'clean' and the other is 'corrupt'. The clean computer runs the internet poker client software. It contains neither the hack software nor the support software for remote access systems. If regulators require GPS verification of the computer's location, then this technology is included with the clean computer. Since the clean computer does not run any illicit software and possesses the required GPS technology (if it were required), the poker client software will never detect anything suspicious thereby enabling the CE to easily overcome geo-location requirements imposed by the poker websites and their regulators.

The corrupt computer runs all hack software, remote access support software, and the software for a frame grabber that in one implementation grabs the output signal from the clean computer's SVGA port. Keyboard and mouse commands—processed using standard drivers—are sent from the corrupt computer to a clean computer's USB port.

A minimum of three critical software processes are run on the corrupt computer. The first is an encrypted, private, CE-operated communications tool. The second is the 'card clipping' software that captures an image of the player's hole cards, transmits it to the CE's server, and retrieves the images of the other three players' hole cards. A private, CE-controlled instant messaging system is built into the card clip application. The third process allows CE 'players' (AKA 'soldiers') to control the corrupt and clean computers from anywhere in the world—again in an undetectable manner.

The CE uses state-of-the-art technology to manage communication among CE soldiers and the CE leadership. Soldiers can play poker on any computer located anywhere on the internet using a device called a 'remote access appliance' (e.g. Bomgar). Appliances such as the Bomgar device allow the CE to control thousands of remote computers without risking discovery by counter-terrorism investigators. By using a hardware appliance, the CE avoids using commercial remote access services such as GoToMyPC.com that could cooperate with law enforcement or counter-terrorism authorities. And, while all communications between CE leaders, soldiers, and cell leaders are undetectable, they are nonetheless encrypted and always sent via means under the complete control of the CE.

Custom server-side software is used to manage all administrative tasks such as maintaining login credentials for mule accounts, internal communications, game-in-progress data distribution, and generating and managing the games. An electronic database is used to persist data.

In one example, the CE business process starts with customer operative A hiring a money mule B. Mule B is instructed to open a conventional bank account and deposit money provided by operative A. Mule B is then instructed to open one or more internet poker accounts, using the mule's legitimate identity and bank account. The same process occurs between mule C and customer operative D in the country where the operative's money is to be transferred. Once the accounts are opened and the mules' identities are verified to the satisfaction of the poker website, mules B and C give the online logins for their bank account, the poker account(s), and email account associated with the poker websites to customer operatives A and D, respectively. Operatives A and D then send the logins to CE personnel using a privately operated, encrypted communication system. Finally, customer operatives A and D provide mules B and C with specially prepared computer hardware and software systems. Once these procedures are complete, the mules just need to keep the computers running and maintain connectivity to the internet. Mules are usually used indefinitely by the customer operatives and will likely be kept "in the dark", so they may or may not have knowledge of the CE's operations, and may or may not be paid for their services. And if A and B or C and D are compromised, law enforcement or counter-terrorism authorities will have no way of linking operatives A and D because the CE has procedures in place to alter personnel distribution and immediately relocate servers and other traceable technology.

The possibility of money laundering with internet poker presents law enforcement and counter-terrorism authorities with a dilemma. If a money mule is discovered, he or she is unlikely to know anything useful beyond possibly identifying their TCO contact. Furthermore, since the mule doesn't actually play poker, he or she will have no knowledge of the other players at the virtual poker tables. This ensures that authorities will likely bear the expense of an international investigation involving several different foreign jurisdictions.

As this scenario illustrates, current technology and regulatory schemes are not sufficient to keep TCOs from exploiting internet poker. Two innovations are required: (1) a way to remove substantial control of computer hardware and software from an internet poker player while allowing the computer equipment to remain in the possession of the player, and (2) a way to reliably confirm the player's true identity and/or physical location.

SUMMARY OF THE INVENTION

The present subject matter seeks to eliminate or reduce at least some of the problems described above, in some aspects by introducing an independent third party responsible for verifying a person's true identity in a specific, real-world location and in the physical presence of the verified person. The provider of the third party services may offer infrastructure and procedures so secure and reliable that it can assume responsibility for accurate identification, partly relieving online banks, retailers, and operators of sensitive government and corporate networks of liability burden. In effect, the purpose of the invention is to create the conceptual equivalent of a 'website SSL certificate' for human beings.

According to first aspects of the invention, a computer-implemented method may provide third party user authentication for a first party user attempting to access a network service provided by a second party. Such methods may include one or more of registering a network service; registering a user device with a first user; generating a first encryption key associated with the user device; receiving a first encrypted check message from the user device; receiving a second encrypted check message from the network service; decrypting the first check message and the second check message using the first encryption key; comparing timestamps included in the first check message and the second check message; authorizing at least one of a network access or a transaction between the first user and the network service based at least in part on a difference between the timestamps being less than a threshold; and/or sending an authorization message to the network service based on said authorizing.

In embodiments, registering the user device with the first user may include acquiring biometric data of the user via an agent of the third party; storing the biometric data on the user device as biometric reference data using computer instructions and an encryption key provided by the third party; reacquiring the user's biometric data via a test scan using a biometric scanner of the user device; verifying that the biometric reference data is accurately stored on the user device by comparing the test scan to the biometric reference data; and/or causing the user device to delete said computer instructions based on the verification that the biometric reference data is accurately stored on the user device.

In embodiments, the network service may include a computer network of the second party, and the second encrypted check message may be based at least in part on a communication between the user device and a workstation connected to the computer network.

In embodiments, the network service may include a network banking website, and the second encrypted check message may be based at least in part on a communication between the user device and a workstation connected to the network banking website.

In embodiments, the network service may include an online purchase, and the second encrypted check message may be based at least in part on confirming the identity of a person operating the user device.

In embodiments, registering the user device with the first user may include storing biometric data of the first user on the user device as biometric reference data using computer instructions provided by the third party. The first check message may be sent from the user device based at least in part on a comparison between current biometric data and the biometric reference data; and/or the second check message may be sent based at least in part on the comparison between current biometric data and the biometric reference data.

In embodiments, the user's biometric data may not be communicated to, or maintained by, the network service or the third party.

In embodiments, registering the user device with the first user may include configuring a one-time password service associating the first user and the user device using computer instructions provided by the third party, at least one parameter used by one-time password service being stored locally on the user device and inaccessible by the third party. The first check message may be sent from the user device based at least in part on an identity check performed via the user device using the one-time password service; and/or the second check message may be sent based at least in part on the identity check.

In embodiments, the second check message may be based at least in part on the network service confirming that the user device is authorized to access the network service.

According to further aspects of the invention, a method of registering a secure identity device may include one or more of receiving an authorization proof message from an authorizing agent, the authorization proof message including an authorization device identifier, location information, and a timestamp; receiving a composite proof message via the user device, the composite proof message including a unique device identifier, an encrypted version of the authorization proof message, and a timestamp; generating a first encryption key associated with the user device based at least in part on a comparison of the authorization proof message and the composite proof message; and/or sending the first encryption key to at least one of the authorizing agent and the user device.

Embodiments may include receiving a first encrypted check message from the user device; receiving a second encrypted check message from a network service provider; decrypting the first check message and the second check message using the first encryption key; comparing timestamps included in the first check message and the second check message; authorizing at least one of a network access or a transaction between the first user and the network service provider based at least in part on a difference between the timestamps being less than a threshold; and/or sending an authorization message to the network service provider based on said authorizing.

In embodiments, the first and second check messages may be based at least in part on a biometric user confirmation performed by the user device.

In embodiments, comparing the authorization proof message and the composite proof message may include comparing the timestamp information and decrypting the encrypted authorization proof message.

Embodiments may include authorizing biometric data to be stored on the user device based at least in part on confirmation that the user device is located in proximity to the authorizing device.

According to further aspects of the invention, a secure identity user device may include one or more of a processor, and memory including instructions configured to establish local communication with an authorization device; receive an authorization proof message from the authorization device, the authorization proof message including an authorization device identifier, location information, and a timestamp; generate a composite proof message including a unique user device identifier, an encrypted version of the authorization proof message, and a timestamp; send the composite proof message to an authorization service; receive a first encryption key via at least one of the authorization device and the device authorization service; and/or authenticate the user device with a second party service provider. Authenticating the user device with the second party service provider may include encrypting a first check message using the first encryption key; encrypting a second check message using the first encryption key; sending the first check message to the authorization service; and/or sending the second check message to the service provider. In embodiments, the first check message and the second check message may include the user device identifier and a timestamp.

Embodiments may include computer instructions configured to acquire biometric data of the user based at least in part on local communication with the authorization device; store the biometric data on the user device as biometric reference data using first computer instructions and an encryption key provided by the device authorization service; reacquire the user's biometric data via a test scan using a biometric scanner of the user device; verify that the biometric reference data is accurately stored on the user device by comparing the test scan to the biometric reference data; and/or delete said first computer instructions based on the verification that the biometric reference data is accurately stored on the user device.

In embodiments, the first and second check messages may be based at least in part on a biometric user confirmation performed by the user device using the biometric reference data.

In embodiments, the biometric data may be stored on the user device based at least in part on confirmation that the user device is located in proximity to the authorizing device.

In embodiments, the biometric reference data may be configured such that a user of the user device cannot change the biometric reference data without participation of the device authorization service.

In embodiments, a data delete circuit may be configured to automatically render inoperable the biometric reference data based on physical tampering with the user device.

According to further aspects of the invention, a tamper-resistant system for engaging in an online activity, while verifying the identity and/or physical location of a user, is provided. The system may include a casing, with a microprocessor and/or a memory housed in the casing.

The system may include a biometric information identification module configured to obtain, store and/or transmit biometric identification data, e.g. for one or more distinct user(s) of the system. In embodiments, the biometric information identification module may include a biometric scanner, such as, for example, a fingerprint scanner, a retina scanner, a DNA scanner, etc.

In embodiments, the microprocessor may be configured to obtain biometric identification information of the user, for example, during a configuration of the system to the user, and/or during an initiation of an online activity.

In embodiments, the user biometric identification data may include encrypted biometric reference data that is stored, for example, during an initial configuration of the system to the user. The memory may include a volatile, or non-volatile memory, for storing the encrypted biometric reference data, which may be configured to automatically erase stored data when power to the memory is reduced or lost.

In embodiments, the system may include a tamper-detection module configured to detect tampering with, for example, the casing and/or connectors of the casing. The tamper-detection module may include, for example, one or more energized anti-tamper electrical circuits that become de-energized when a switch is opened or a circuit conductor is broken in response to an attempt to open the casing, or the like.

In embodiments, the system may include a power supply, which may include, for example, a rechargeable battery. The power supply may include separate power sources for providing power to various components of the system, e.g. to the storage memory, the microprocessor and/or the tamper-detection module. In embodiments, the power source may include a rechargeable battery, separate from a main power supply, the rechargeable battery powering the anti-tamper electrical circuits and/or a memory storage device.

Embodiments may also include a controller module containing automated instructions for monitoring the status of the anti-tamper electrical circuits and for erasing user identification or other data, such as the encrypted biometric reference data, from memory when the tamper-detection module detects tampering with the system, e.g. when any one of the plurality of anti-tamper electrical circuits is de-energized, or when the power level of the rechargeable battery or other power source falls below a certain threshold.

A location module may also be provided that is configured to receive navigation signals broadcast from navigation transmitters, and/or to provide location information of the system. The location module may include, for example, a GPS receiver, GPS processing module, and/or GPS location transmitter. In embodiments, the processor is may be configured to periodically transmit location information of the system.

The system may be configured to periodically transmit biometric identification data while the user is engaging in an online activity, and to erase the user biometric identification data from memory based on, for example, a detected tampering with the casing or connectors of the casing, and/or a power deficiency from the power supply.

The system may be configured for engaging in online activities, such as online gambling, and periodically transmitting the location information of the system and/or the biometric identification data while the user is engaging in the online activity. Accordingly, if the biometric, or other pertinent data, is deleted or disturbed during the online activity, the activity may be terminated by the sponsor/host.

According to embodiments, the system may include certain non-detachable components (i.e. components that are fixedly integrated with the casing and/or monitored for continuous connection by the tamper-detection module) such as a video screen, a keyboard, a cursor control device, a volatile and/or non-volatile memory, a central processing unit, a network controller, a navigation system, and/or a biometric scanning device.

According to further aspects of the invention methods of providing a secure online service may include one or more of storing biometric reference data of a user in a database; receiving a request to provide the online service to the user; while providing the online service to the user, periodically receiving current biometric data of the user; comparing the current biometric data of the user to the stored biometric reference data; and/or terminating the online service if (a) the current biometric data does not correspond to the stored biometric reference data, or (b) if the current biometric data is not received after a predetermined period of time.

Methods may also include receiving current location information from the user, and/or comparing the location information to predetermined geographical areas in which the online service may be provided before providing the service.

Embodiments may also include terminating the online service if the current location information changes to an area in which the online service is prohibited.

In embodiments, the online service may include transferring funds between different users, and/or the online service may include online gambling, such as online poker.

According to further aspects of the invention methods of engaging in a secure online service may include one or more of configuring a secure device to include biometric reference data of a user; sending a request from the secure device for the user to engage in the online service; while engaging in the online service, periodically sending at least one of the biometric reference data and current biometric data of the user to a service provider; and/or deleting the at least one of biometric reference data and current biometric data from the secure device if at least one of the device is tampered with and if a power source of the device falls below a required level.

Embodiments may also include sending current location information from the device when requesting the online service or while engaging in the online service.

In embodiments, the current location information may include, for example, a GPS location.

In embodiments, the online service may include transferring funds between different users, and/or the online service may include online gambling.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION OF THE INVENTION

Figure 1:
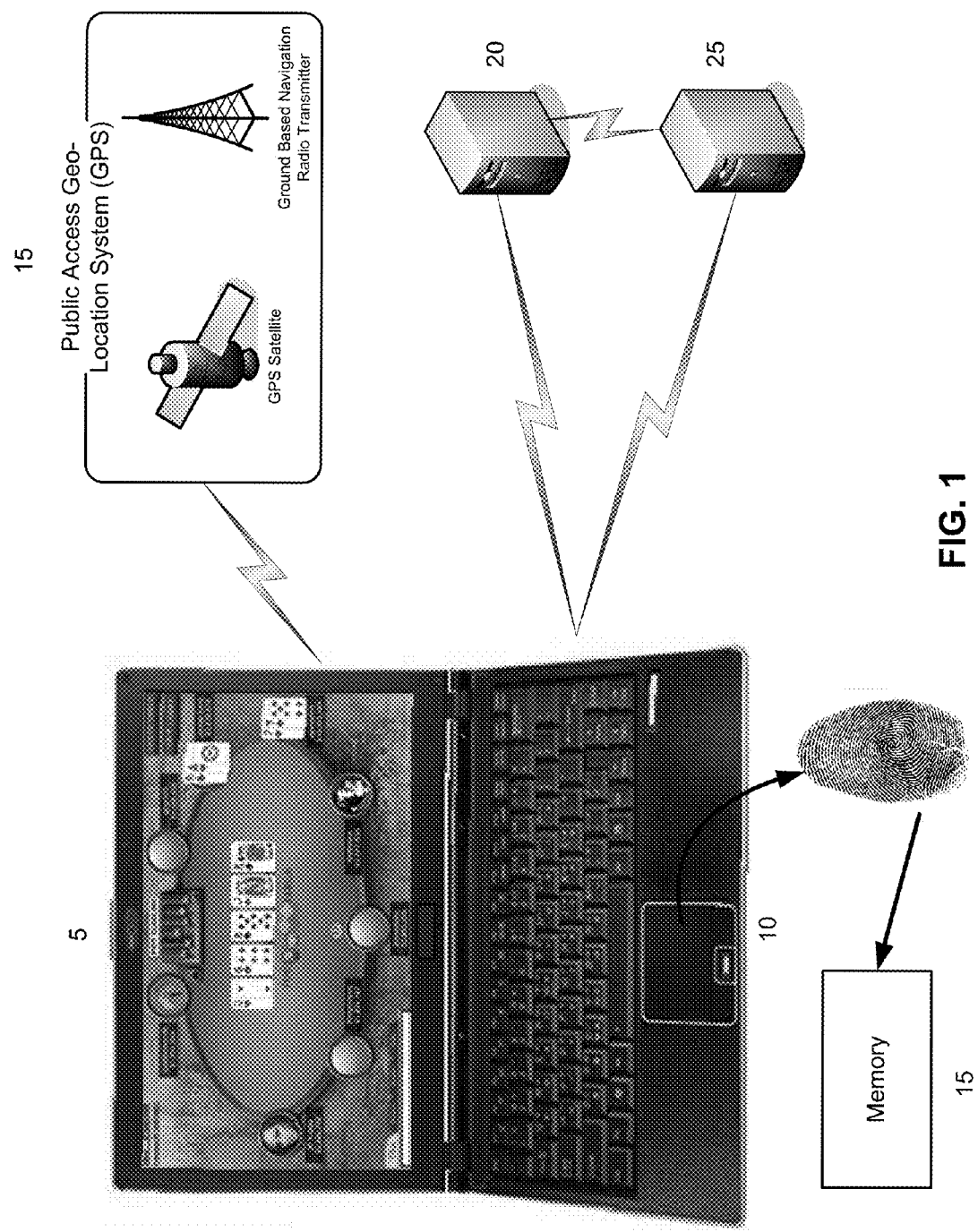
FIG. 1 illustrates an internet poker system constructed according to aspects of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a server" is a reference to one or more server and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

The figures and flowcharts describe an embodiment of the invention that applies to the online version of poker. In this description, the term 'internet poker appliance' is a particular computing device with special features specific to poker in addition to the features of the invention. The combination of computer memory for storing the encrypted biometric reference, a control module containing the software that manages the storing and destruction of the encrypted biometric reference data, anti-tamper circuits and switches, and a power source for maintaining both memory and control module state is referred to as a 'suicide circuit'.

FIG. 1 shows one example of an internet poker appliance (5) according to aspects of the invention. As shown in FIG. 1, a tamper-resistant system may be provided for playing internet poker, including integrated geo-location and biometric player identification. In addition to the typical components found in state of the art computing devices, the internet poker appliance in this embodiment incorporates a biometric scanner fingerprint reader (10) and circuitry for receiving signals from satellite or terrestrial radio navigation transmitters (15). One or more independent third party identity management providers (20) confirm the identity of the poker appliance owner-user, manage the acquisition of the user's biometric reference data, and store and distribute the encryption keys required to encrypt and decrypt the biometric reference data. In embodiments, the biometric reference data may include biometric scan data, stored inside the computing device, against which all subsequent identity verification biometric scans may be compared. In embodiments, the internet poker website infrastructure (25) may be responsible for verifying the identity and location of the player both at log-in and during play, as well as providing/hosting the poker or other online activity.

As discussed further herein, internet poker appliance (5) may include 'suicide circuits' connected to all significant fasteners. For example, laminated sheets with integrated 'suicide circuit' conductors may be firmly affixed to the inside surfaces of major enclosure panels to prevent access to interior hardware by cutting. Any break in any circuit will cause a 'Suicide Circuit Controller' to erase biometric reference data stored in a volatile or non-volatile memory (15).

Figure 2:
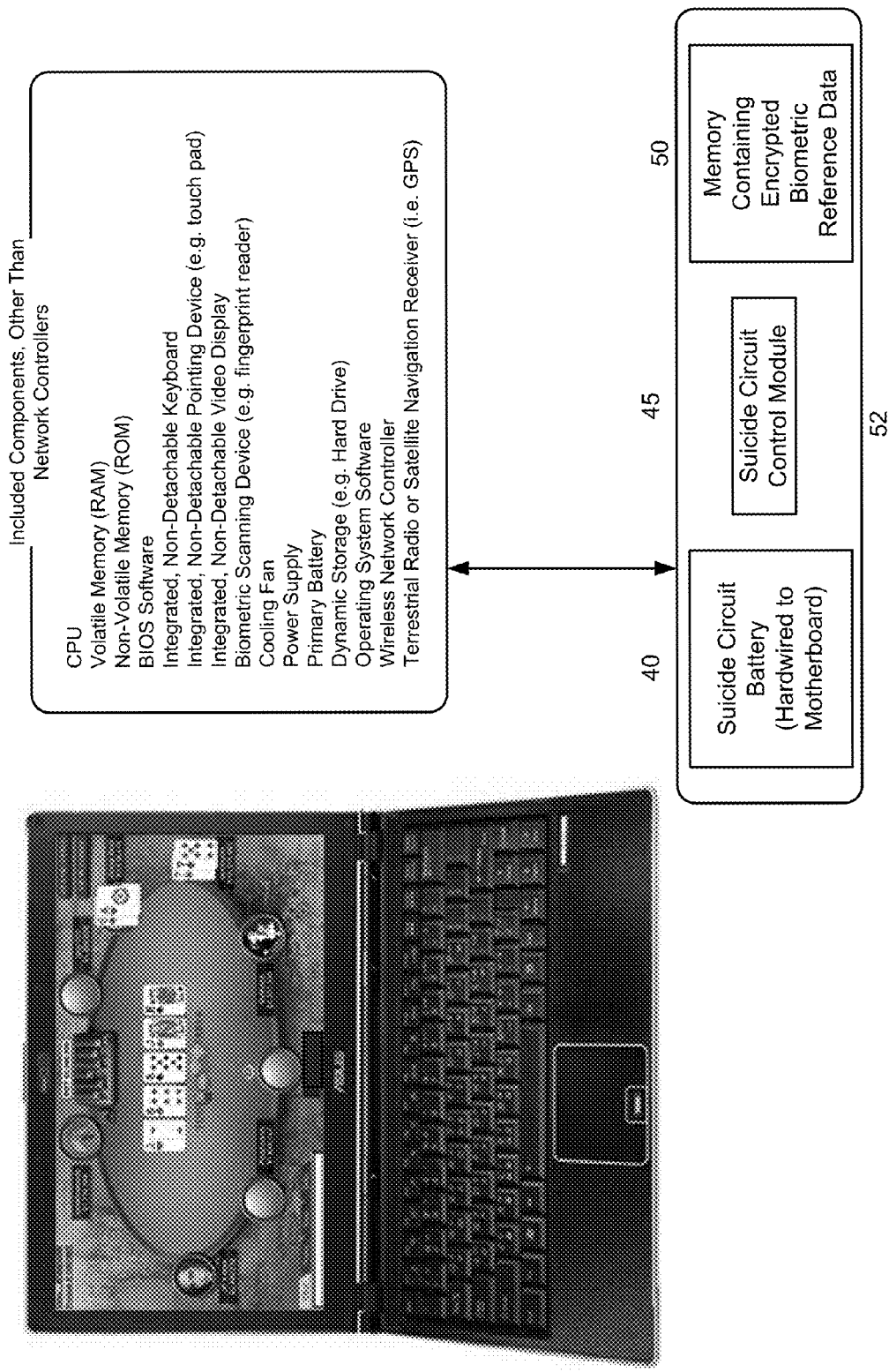
FIG. 2 illustrates an internet poker appliance constructed according to aspects of the invention, where various components that may be included in the appliance.

FIG. 2 shows a schematic diagram including possible hardware and software components as may be included in internet poker appliance (5). As discussed herein, various of the listed components may be included within, and/or integrated with a tamper-proof or resistant case. In embodiments, exemplary user systems such as the internet poker appliance (5) may be precluded from including one or more of the following, USB ports, infrared ports, firewire ports, modems, video ports with input, additional communications ports of any kind, CD-RW, DVD-RW storage devices, memory device ports (e.g. flash memory cards), etc. to enhance the security of the system. Elimination of communications ports and other similar components found in conventional computing devices may help to ensure that a person cannot modify the device software or hardware.

As also shown in FIG. 2, features related to the function of internet poker appliance (5) that may be included in a tamper-proof casing (52), may include a battery (40) to power the suicide circuits and/or memory, a suicide circuit control module (45), and memory 50 for storing biometric reference data (50). One or more microprocessors and associated parts (not shown) may also be included in the casing 52. The battery (40) may be the main stored power source for the entire device or a separate battery dedicated to the maintenance of the suicide circuit components and/or memory. The suicide circuit control module (45) may contain software, firmware and/or hardware required to write new biometric data into memory (50) and to decide if stored biometric data should be destroyed in response to an attempt by a person to tamper with the device, the expiration of a specified time span, the battery power level dropping below a specified threshold, or any other criteria. The memory used to store the encrypted biometric reference data may be volatile or non-volatile but is dedicated to the single purpose of storing biometric data. In embodiments, data may be erased, for example, by positively directing a delete function, e.g. to non-volatile memory, or powering off volatile memory.

The internet poker appliance (5) may be configured, e.g. by hardware or firmware, to obtain biometric identification information of the user, for example, during a configuration of the system to the user, and/or during an initiation of an online activity. For example, the system may be configured such that a vendor selling the system assists in the creation of the user profile and corresponding biometric identification information, e.g. by providing necessary encryption keys etc. Thus, the system may be coded to a particular user when purchased, and may be prevented from being used by others.

A location module may also be provided in the internet poker appliance (5) that is configured to receive navigation signals broadcast from navigation transmitters, and/or to provide location information of the internet poker appliance (5). The location module may include, for example, a GPS receiver, GPS processing module, and/or GPS location transmitter. In embodiments, the processor is may be configured to periodically transmit location information of the internet poker appliance (5) with, or without biometric identification data, while the user is engaging in an online activity.

According to embodiments, the internet poker appliance (5) may include certain non-detachable components (i.e. components that are fixedly integrated with the casing and/or monitored for continuous connection by the tamper-detection module) such as a video screen, a keyboard, a cursor control device, the volatile and/or non-volatile memory, the central processing unit, a network controller, the navigation system, and/or the biometric scanning device.

Figure 3:
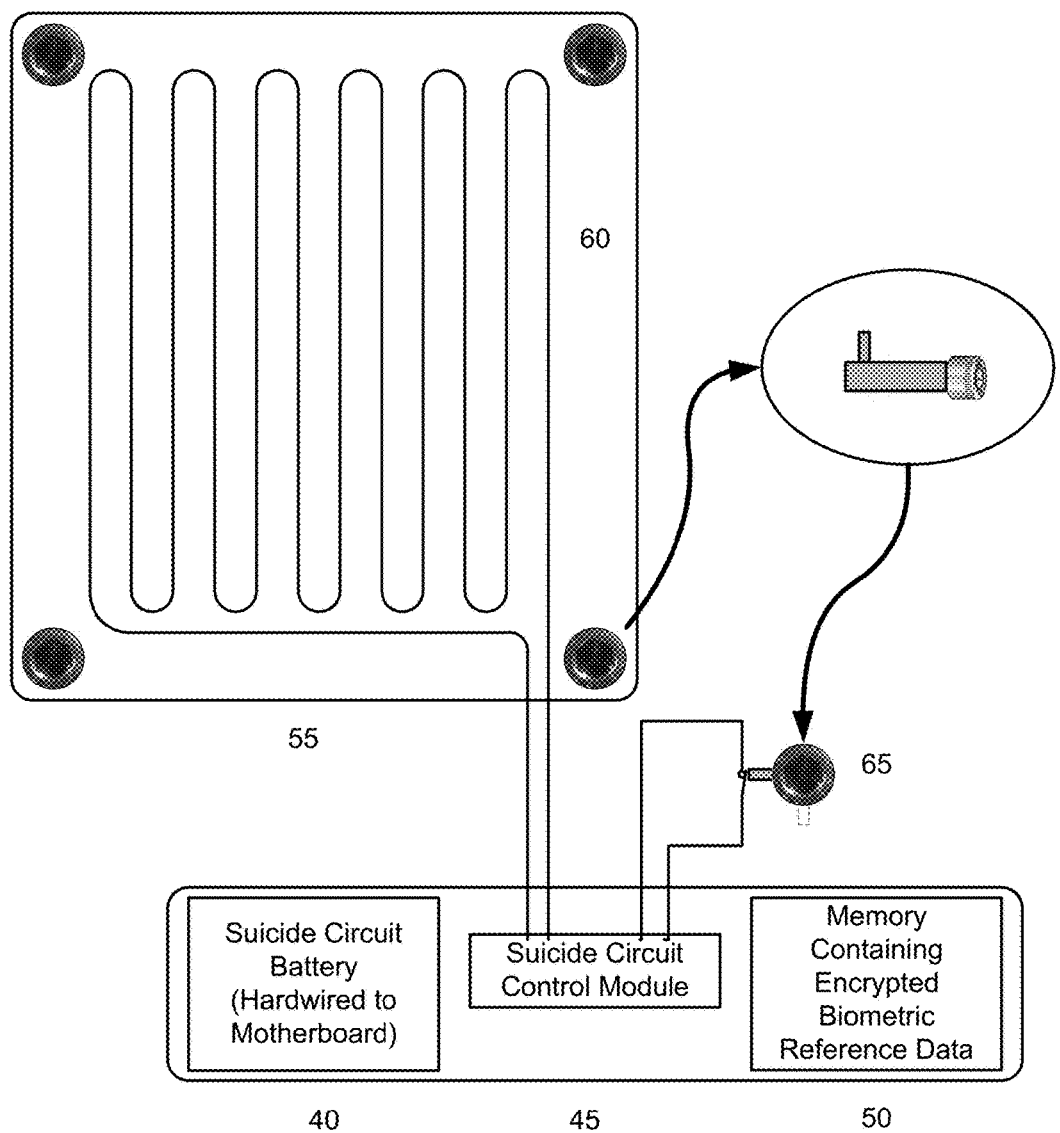
FIG. 3 illustrates an anti-tampering circuit for an internet poker appliance constructed according to aspects of the invention.

FIG. 3 shows an exemplary anti-tamper systems that may be employed in an embodiment of the invention. In embodiments, electrical circuitry associated with an anti-tamper system may be connected to the suicide circuit control module (45). If an anti-tamper mechanism is breached, the suicide circuit control module (45) may receive notification of the event and in response, destroy the encrypted biometric reference data stored in the suicide circuit dedicated memory (50). One anti-tamper technique may involve electrical conductors attached in a wide-area pattern (60) to the inside of the computing device enclosure(s) (55). If a person or person using cutting devices or other tools attempts to cut through the enclosure, the electrical circuit formed by the conductors will be broken, thus indicating to the suicide circuit control module (45) that the biometric reference data should be destroyed. Switches attached to the internet poker appliance enclosure fasteners (65) are another possible anti-tamper mechanism connected to the suicide circuit control module (45). For example, the suicide circuit control module (45) may be configured such that, if any attempt is made to remove the fastener (65), a switch is opened and the biometric reference data, or other data stored in the memory, is deleted.

As one of skill in the art can appreciate, many other anti-tamper technologies and techniques may be employed that provide a signal to the suicide circuit control module (45) indicating the status of the anti-tamper system(s).

Explanation of Flowcharts

Figure 4:
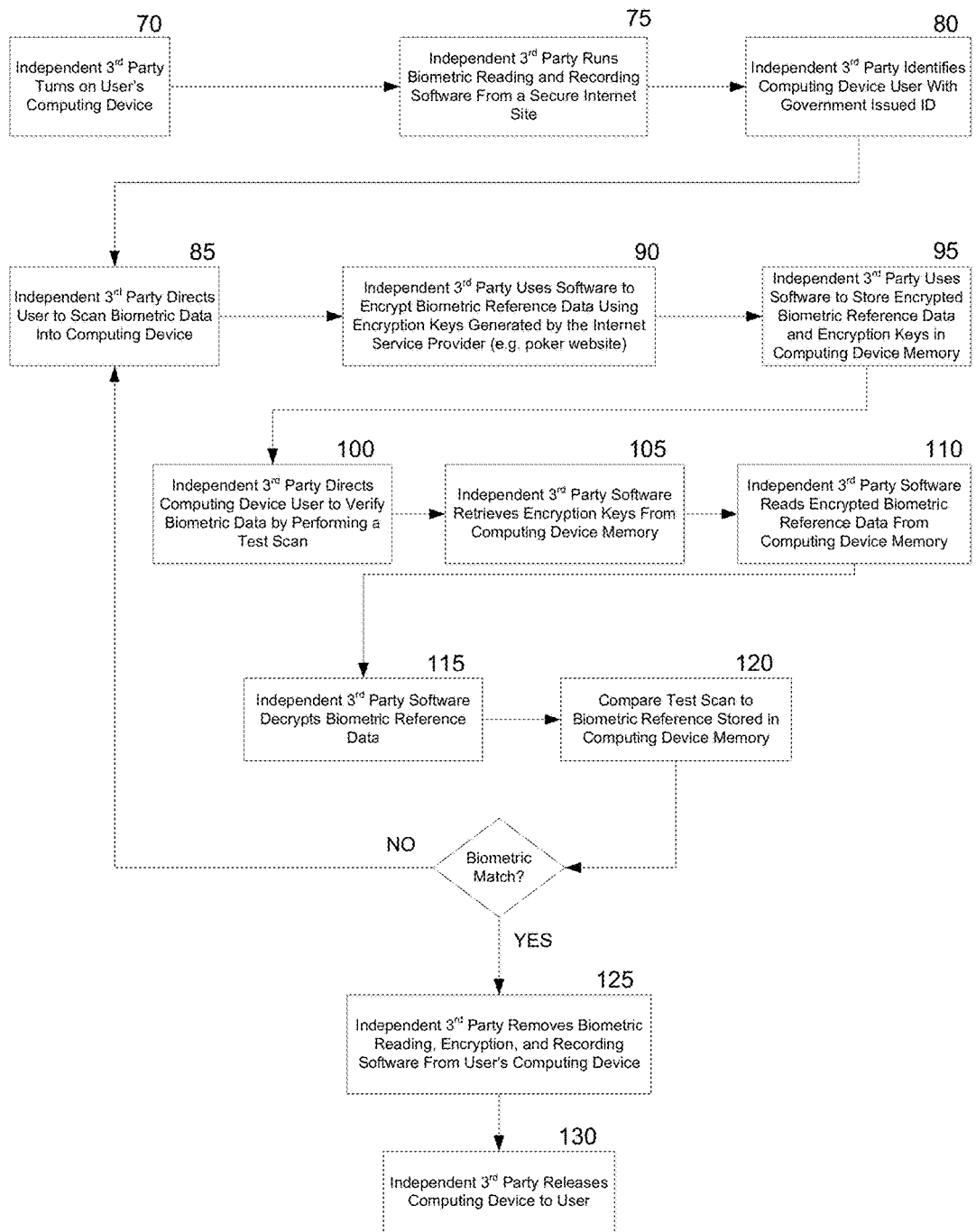
FIG. 4 is a flowchart illustrating a method for verifying a poker player identity according to aspects of the invention.

FIG. 4 shows a process for an independent third party verifying the identity of the computing device user, acquiring the reference biometric data, and encrypting and storing the biometric reference data in the computing device suicide circuit memory. All steps in FIG. 4 may involve internet communication through a 'virtual private network' or VPN.

The term 'independent third party' refers to a company or person not affiliated in any way with the user-owner of the special computing device. An independent third party (ITP) may or may not be affiliated with the provider of a regulated internet service such as internet poker.

In the presence of the computing device user-owner, the ITP representative turns on the special computing device (70). The ITP representative then navigates to a website authorized by the special computing device operating system software. From the authorized website, the ITP representative downloads and launches software designed to acquire, encrypt, and store the user-owner's biometric reference data (75).

The ITP representative asks the device user-owner for proof of his or her identity. Proof may be any government-issued document such as a driver's license or passport. Using the proof document, the ITP representative verifies the user-owner's identity (80).

The ITP representative then directs the user-owner to scan his or her biometric reference data into the computing device using the scanning component built into the special computing device (85).

Using the software downloaded in step 75, the ITP encrypts the scanned biometric reference data using encryption keys generated by the provider of the regulated services or by another entity. It is understood that any encryption keys are stored outside the special computing device (90).

Once encrypted, the ITP software is used to write the encrypted biometric reference data and encryption keys into the memory controlled and monitored by the suicide circuit control module (95).

The ITP representative then directs the computing device user-owner to verify the encrypted and stored biometric reference data by performing a test scan which involves acquiring new biometric data for comparison to the encrypted and stored data (100).

The ITP software retrieves the encryption keys used to encrypt the biometric reference data from the regulated service provider (e.g. poker website) server the computing device memory (105).

The ITP software reads encrypted biometric reference data from the computing device memory (110).

Using the retrieved encryption key, the ITP software decrypts the biometric reference data (115).

The ITP software compares the test scan biometric data to the biometric reference data stored in the computing device memory (120).

If the two biometric data sets match, the ITP removes the biometric data scanning, encryption, and recording software from the user-owner's computing device (125) and returns the computing device to the user-owner (130).

If the biometric data sets do not match, the ITP repeats the process from either the initial scan (85) or the test scan (100) steps.

It should be appreciated that various encryption techniques may be used to support the concepts of the invention, and that such encryption techniques may involve providing, accessing, and/or storing encryption/decryption keys to and/or from various sources.

Figure 5:
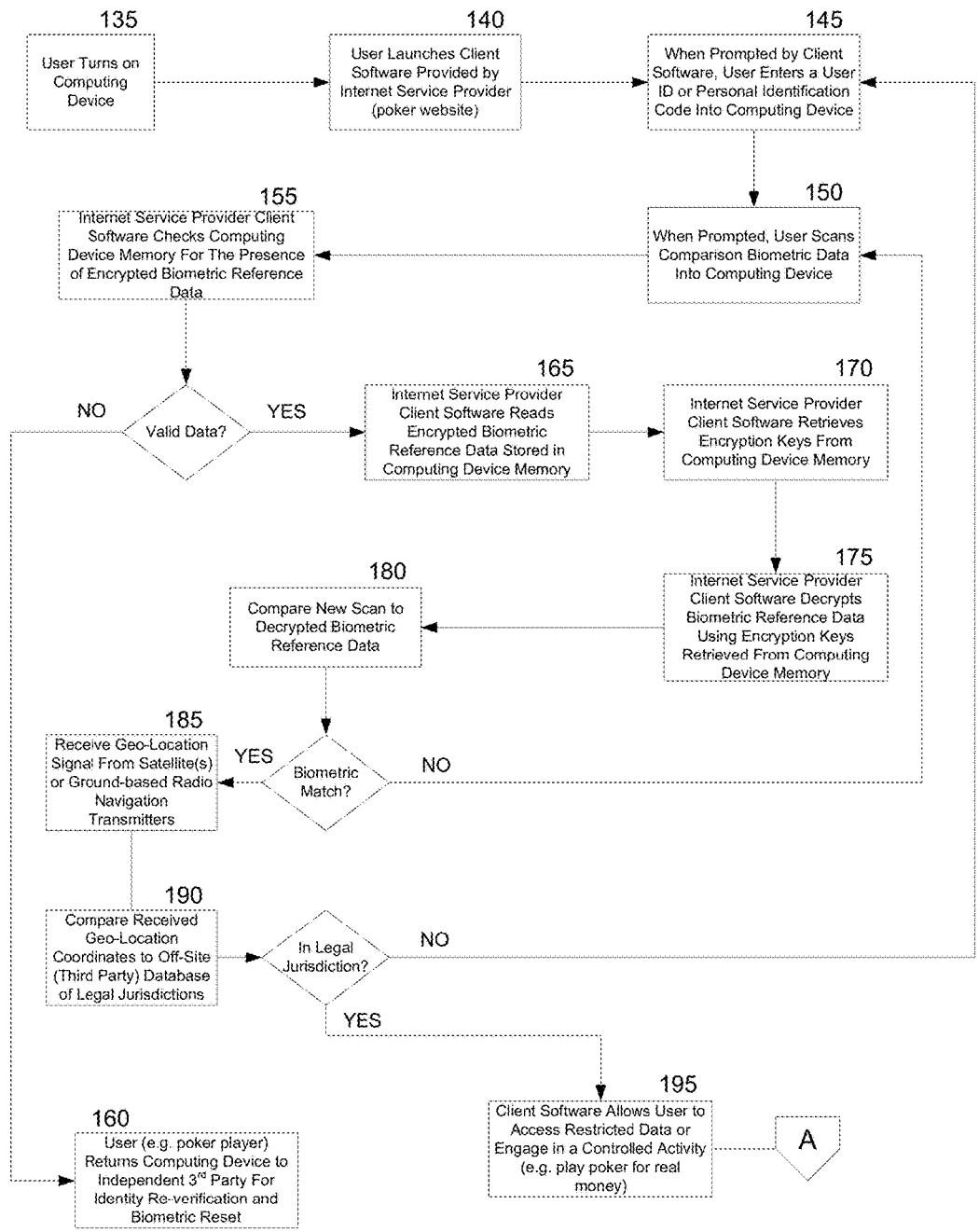
FIG. 5 is a flowchart illustrating a method for logging on to a poker appliance according to aspects of the invention.

FIG. 5 shows a process for a computing device user-owner logging into client software offering controlled, restricted, or regulated functionality. The term 'internet service provider' refers to a business offering controlled, restricted, or regulated functionality through the internet and where the interface with the user-owner of the special computing device is software that runs on the special computing device. The client interface software may be hosted in an internet browser or may run within the computing device operating system.

To begin, the user-owner turns on the special computing device (135).

The user-owner then launches the client software provided by an internet service provider (e.g. poker website) offering controlled, restricted, or regulated functionality. (140).

When prompted by the client software, the user-owner enters a user ID, personal identification code, or other identification token Into the computing device (145).

When prompted, the user-owner scans his or her comparison biometric data into the computing device using the built-in biometric scanner component (150).

The internet service provider client software checks computing device (suicide circuit) memory for the presence of encrypted biometric reference data (155).

If no biometric reference data is detected, the user-owner must return the computing device to an independent third party for identity re-verification and restoration of the biometric reference data (160).

If valid biometric reference data is found, the internet service provider client software reads the encrypted biometric reference data stored in the computing device (suicide circuit) memory (165).

The internet service provider client software retrieves the encryption keys from the internet service provider data store or from the data store of a third party the computing device memory (170).

The internet service provider client software decrypts the biometric reference data using the encryption keys retrieved in step 170 (175).

The internet service provider client software compares the comparison scan from step 150 to the decrypted biometric reference data (180).

If the comparison biometric data does not match the reference data, the user-owner is returned to step 150.

If the comparison is successful, the internet service provider client software verifies the physical location of the special computing device.

The special computing device receives geo-location signals from satellite(s) or ground-based radio navigation transmitters (185).

The internet service provider client software compares geo-location coordinates received in step 185 to an off-site database of legal jurisdictions for the controlled, restricted, or regulated activity (190).

If the received geo-location coordinates are outside a legal jurisdiction where engaging in the controlled, restricted, or regulated activity is authorized, the user-owner is returned to step 145.

If the received geo-location coordinates are inside a legal jurisdiction where engaging in the controlled, restricted, or regulated activity is authorized, the user-owner is allowed by the internet service provider client software to access restricted data or engage in a controlled, restricted, or regulated activity (e.g. play poker for real money) (195).

Figure 6:
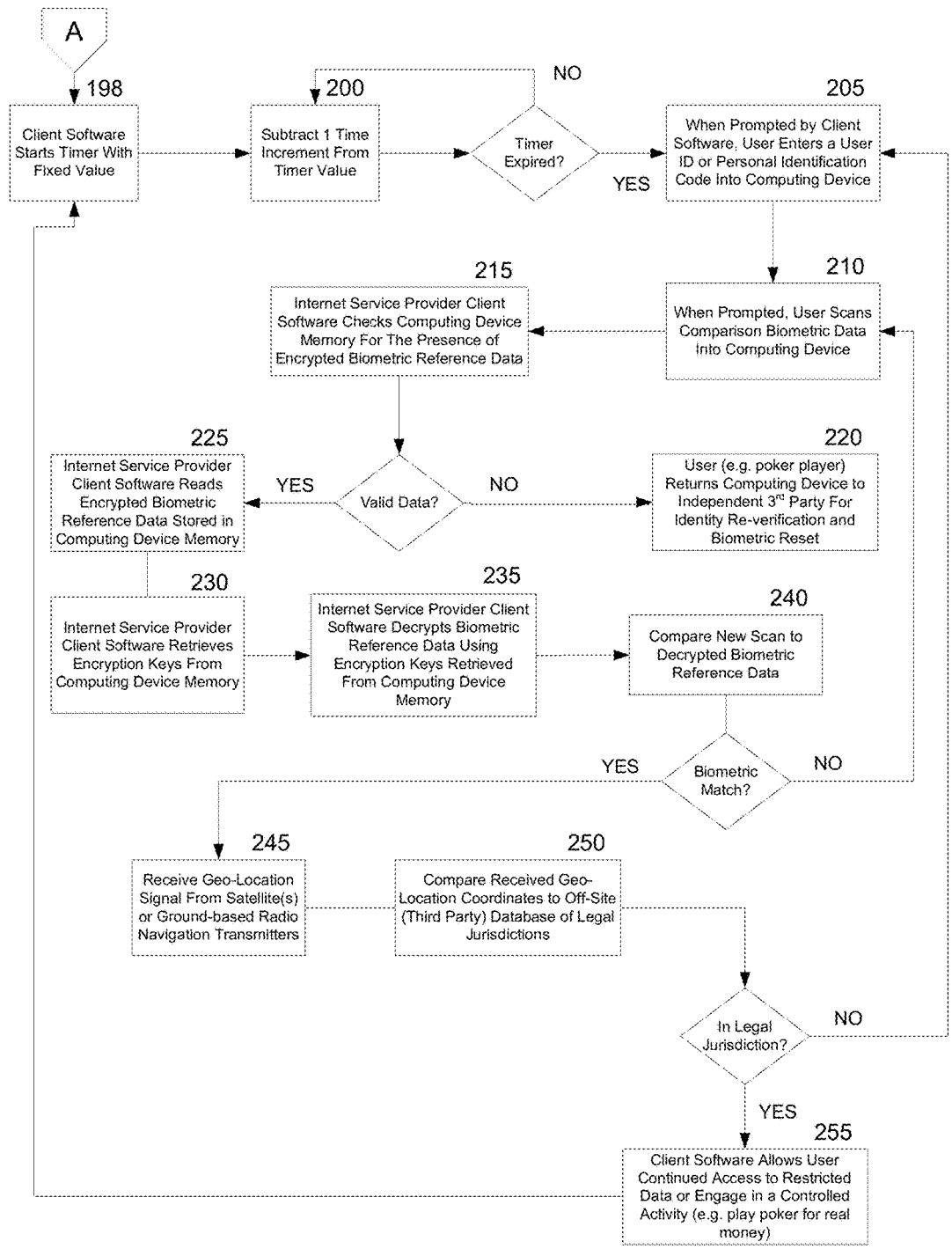
FIG. 6 is a flowchart illustrating a method for maintaining a logged on status according to aspects of the invention.

FIG. 6 shows the process for a user-owner to remain logged into client software that allows the user-owner to engage in a controlled, restricted, or regulated activity.

When the user-owner begins using the client software, a timer is started by the client software with a fixed time duration value (198).

While the user-owner uses the client software, a time increment is subtracted from the timer value of step 198 (200).

The time decay loop of step 200 repeats until the fixed time duration of step 198 has expired.

Upon expiration, the client software prompts the user-owner to enter a user ID, personal identification code, or other identification token Into the computing device (205).

When prompted by the client software, the user-owner scans his or her comparison biometric data into the computing device using the built-in biometric scanner component (210).

The internet service provider client software checks computing device (suicide circuit) memory for the presence of encrypted biometric reference data (215).

If no biometric reference data is detected, the user-owner must return the computing device to an independent third party for identity re-verification and restoration of the biometric reference data (220).

If valid biometric reference data is found, the internet service provider client software reads the encrypted biometric reference data stored in the computing device (suicide circuit) memory (225).

The internet service provider client software retrieves the encryption keys from the internet service provider data store or from the data store of a third party the computing device memory (230).

The internet service provider client software decrypts the biometric reference data using the encryption keys retrieved in step 230 (235).

The internet service provider client software compares the comparison scan from step 210 to the decrypted biometric reference data (240).

If the comparison biometric data does not match the reference data, the user-owner is returned to step 210.

If the comparison is successful, the internet service provider client software verifies the physical location of the special computing device.

The special computing device receives geo-location signals from satellite(s) or ground-based radio navigation transmitters (245).

The internet service provider client software compares geo-location coordinates received in step 185 to an off-site database of legal jurisdictions for the controlled, restricted, or regulated activity (250).

If the received geo-location coordinates are outside a legal jurisdiction where engaging in the controlled, restricted, or regulated activity is authorized, the user-owner is returned to step 205.

If the received geo-location coordinates are inside a legal jurisdiction where engaging in the controlled, restricted, or regulated activity is authorized, the user-owner is allowed continued access to restricted data or continued ability to engage in a controlled, restricted, or regulated activity (e.g. play poker for real money) (255).

Figure 7:
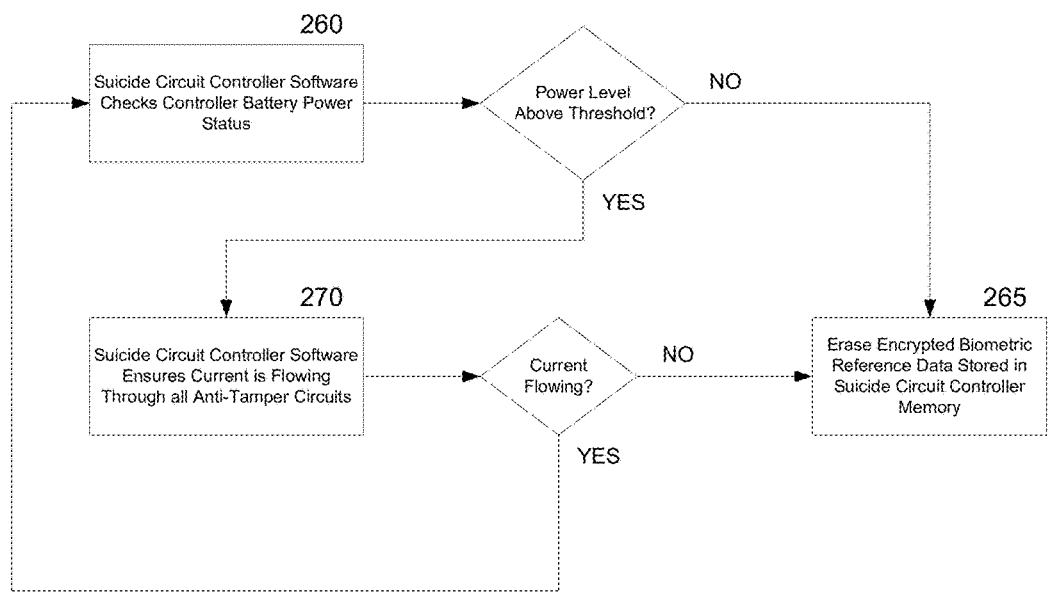
FIG. 7 is a flowchart illustrating a method for triggering a suicide circuit in a poker appliance according to aspects of the invention.

FIG. 7 shows a process for the destruction of the biometric reference data by the suicide circuit control module.

The suicide circuit controller software checks the controller battery power level (260).

If the battery power level is above a predetermined threshold, the suicide circuit controller software ensures that current is flowing through all anti-tamper circuits (270).

If either the battery power level falls below the predetermined threshold or any anti-tamper circuit indicates zero current flow, the suicide circuit controller software will erase the encrypted biometric reference data stored in the suicide circuit controller memory (265). Such functionality may be provided in numerous ways known to those of skill in the art, depending on the type of memory used.

Embodiments of the present invention can include systems for implementing the described methods, as well as computer-readable storage medium coded with instructions for causing a computer to execute the described methods. For example, server systems including at least a processor, a memory and an electronic communication device, may be configured to receive, identify, respond to and/or act on a request, such as those described herein, received over a network, such as the Internet. Such servers may be operated by service providers including, for example, online casinos, government monitoring agencies and/or identity authenticators.

Requests to engage in online activities such as gambling may originate from, for example, a client device according to aspects of the invention, via various networks. Such networks may include any number of communication components including wired, cellular, satellite, optical and/or other similar communication links.

For computer intranet and internet transactions, including but not limited to those previously described, aspects of the present disclosure may replace the use of passwords and certain two-factor identity verification methods in with a single, universally trusted mechanism. Certain exemplary systems described herein may allow a person to have their true identity verified by an independent third party in a real-world location. By ensuring that only a third party agent can collect the biometric reference of the identified person and storing that reference data on the identified person's secure computing device (e.g. smartphone), it becomes prohibitive for the identified person to transfer their device to any other person. This may ensures that the person using the device for sensitive internet or intranet operations is the correctly verified biological entity associated with the device and no other.

To further harden the system, a mechanism is provided that prevents any modification of sensitive data stored on a secure identity device (e.g. smartphone). Should a secure identity device be lost and subsequently tampered with, a 'suicide circuit' tamper prevention system erases all sensitive data stored on the device including the owner's biometric reference data and internal encryption keys.

In embodiments, a personally owned security device, which may be integrated into a smartphone, may be used to make purchases online, engage in online banking transactions, and gain authorized access to highly sensitive government or corporate networks with only a single third party 'real-world' identity verification event required to initialize the device. This may enable a single factor, universally trusted identity verification for any computer network login or internet transaction.

To illustrate, consider a case where an employee contractor works on a military base and requires access to a base computer network both on-premises and via a virtual private network (VPN) when traveling. The contactor purchases a new smartphone with the security features described herein and wants to use the smartphone device to log in to the base computer network either on-premises or through the VPN. Since the phone is personally owned, the contractor may also want to use the device to make secure online purchases and engage in online banking transactions. The contractor may want to review his or her electronic health records which are stored with a health management company.

Each of the online entities requiring reliable identity verification are independent of one another and use a single third party service to confirm a user's identity. In the illustration above, the military authorities will likely require that they be agents of the third party verification service for the purposes of device initialization through real-world identity verification. Being a military authority, this identity verification may also be acceptable to online financial institutions, online retailers, government tax authorities, and, ultimately, political elections officials. Stated another way, businesses and government agencies may trust the identification accuracy of the military authorities.

Once a person's secure identity device (e.g. smartphone) is initialized with a biometric reference linking the biological person to the device, any transaction requiring reliable identity verification may be completed with a single biometric scan which is compared to the reference stored inside the device. In embodiments, agents of the third party cannot access, change, or otherwise have knowledge of any sensitive information, including encryption keys, at any point during or after the real-world identity verification procedure.

This and other identity verification scenarios may be widely enabled by aspects of the present subject matter, using a single, non-transferable biometric scan. Various observers may perceive the degree of advantage of such a system over existing methods differently but for the most identity and security critical online activity, voting in political elections, a system like the one described herein is likely required.

Two aspects relevant to the present subject matter are privacy protection and data dispersion.

Although the independent third party is responsible for verifying human identities in some embodiments, in at least some implementations, the third party system does not store any information about the verified person, e.g. no names, addresses, phone numbers, email addresses and/or tax ID numbers are stored on any third party infrastructure. All personal data may be stored in the secure identity device and protected by the 'suicide circuit' anti-tamper system. In some embodiments, only the secure identity device public serial number and a private encryption key, issued by the third party during the real-world device initialization and identity verification process, need be managed by the third party. This design removes or significantly reduces any incentive for hackers to target the third party.

Data dispersion is another feature of the present disclosure designed to deter hackers. In embodiments, most personal data is stored 'at rest' only inside the data owner's secure identity device. This ensures that hackers never have a single, aggregated database to target. The universe of all users' data is dispersed across thousands or millions of devices (rather than maintained in a single target). In those cases where data is naturally stored in aggregated databases, such as with electronic health records, every data unit may be encrypted with the data owner's encryption key when at rest or in transit. This ensures that if the aggregated database is ever compromised, it will never be useful to hackers since each data unit is encrypted with a different key and those keys exist in only two places: the data owner's secure identity device and the independent third party infrastructure. Data unit encryption keys are never provided to any outside company or government entity, including those that aggregate many data units in a single database. Various embodiments related to these objects are discussed further below with reference to FIGS. 8-15.

Figure 8:
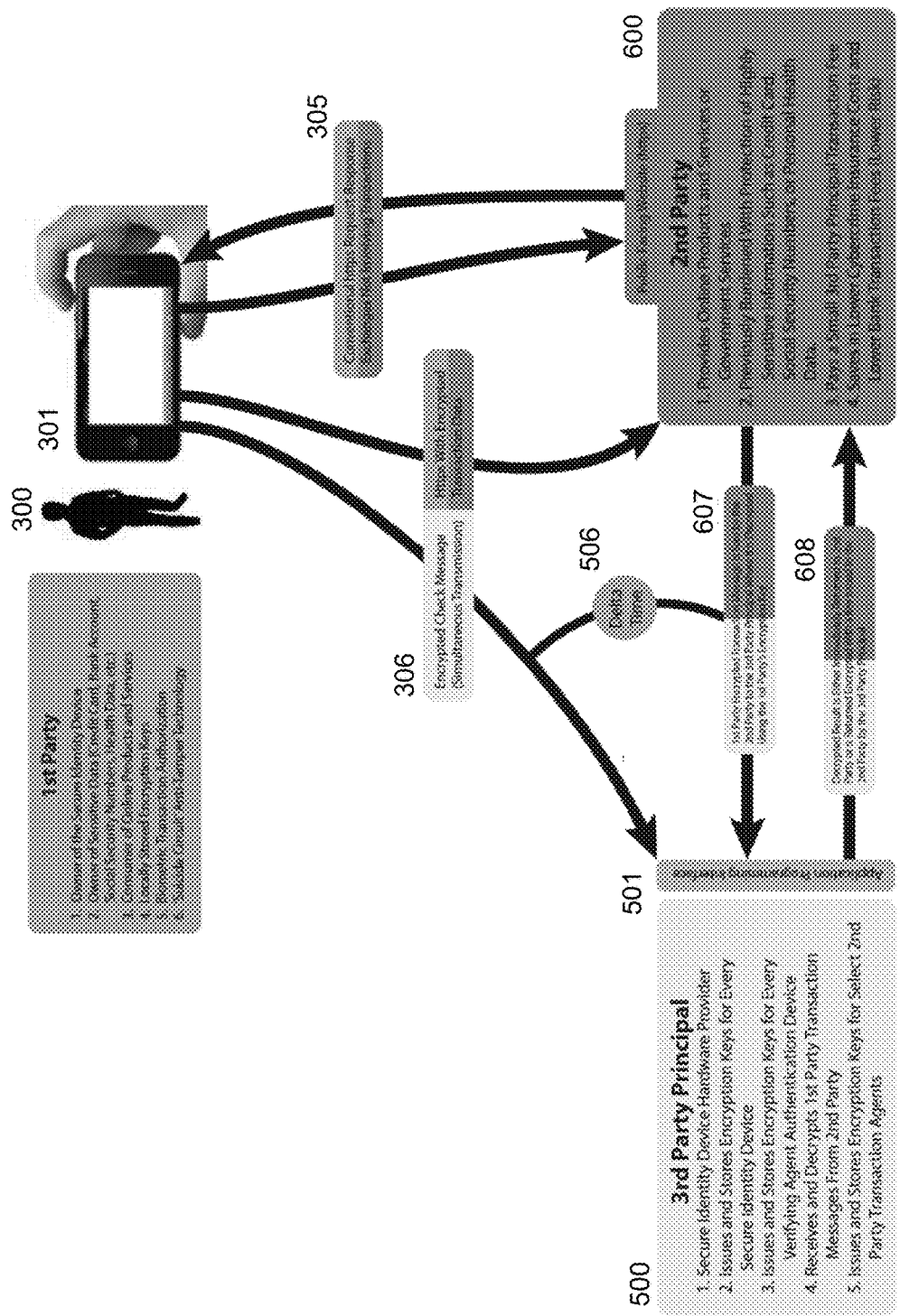
FIG. 8 illustrates an exemplary process for authenticating a secure identity user device according to aspects of the invention.
Figure 9:
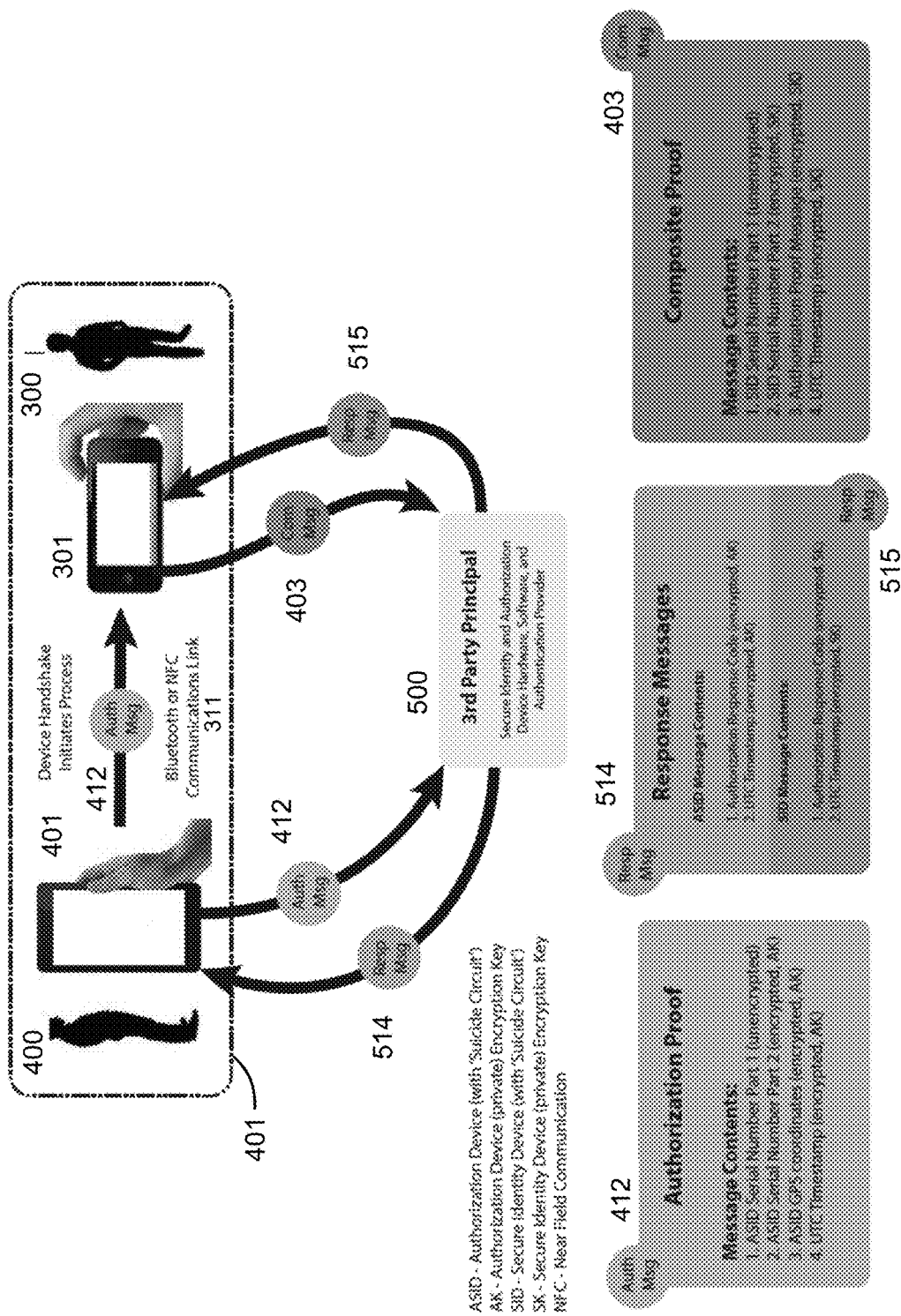
FIG. 9 illustrates an exemplary process for initializing a secure identity user device according to aspects of the invention.

As shown in FIGS. 8 and 9, a security solution according to certain aspects of the invention may include a mobile secure identity device (SID) 301, a mobile authorization device (ASID) 401, and cryptographic processing infrastructure 500 that enable a device to be securely linked to a verified user 300.

The SID 301 contains a user's biometric reference data (reference fingerprint, iris or retina scan) and other vital data that only an authorized third party agent 400 can initially collect. The SID 301 is equipped with 'Suicide Circuit' technology to eliminate the threat of hardware hacks.

The ASID 410 is used by third party agents to collect the user's biometric reference and may be equipped with a GPS receiver and Suicide Circuit technology. The authorization procedure involving the ASID is performed only one time for a user, such as when the user purchases or is assigned the SID 301, which may include when an employee is in-processed by a second party employer/agency.

Cryptographic processing infrastructure 500 is operated on behalf of various second parties 600. The third party infrastructure enables comprehensive, fully automated verification services. By design, neither the first party user/employee 300 nor second party (e.g. service or network operator) 600 has access to any part of the third party infrastructure except through the outward—facing application programming interface (API) 501.

Only an agent 400 of the third party can collect the biometric reference and any attempt to tamper with the hardware will neutralize the SID 301.

As shown in FIG. 8, the 'First Party' consists of a human being (person) 300 and SID 301. The person 300 is 'biometrically bound' to a single SID 301 via a biometric scanner built into the SID 301. The person has a verified identity confirmed by a conventional authority such as a government driver's license issuer or government tax agency. Each SID 301 has one and only one biometrically bound user 300 and the device memory contains a biometric reference against which future biometric scans are compared when verifying the device user person's identity. The device memory may also contain sensitive personal data such as credit card and bank account numbers, tax identification number(s), health care data, and other highly sensitive information. Finally, the device memory contains one or more encryption keys, at least some of which may be issued by the independent third party cryptographic processing infrastructure 500.

The human person 300 user may be associated with the SID 301 and may be one or more of the following: consumer of online products and services; employee and/or user of a second party 600 (which may use the SID 301 for logging into second party web pages or networks; a taxpayer; a patient in an electronic health care ecosystem; a participant in any other activity requiring reliable verification of the first party SID 301 owner-user's true identity.

The SID 301 may be a mobile computing device as described herein, and may be connected to the internet or other networks, containing a biometric scanner, both volatile and non-volatile memory, anti-tamper technology, and one or more encryption keys. The device memory components may contain the encryptions keys, the reference data representing the SID owner-user's 300 biometric definition against which every subsequent biometric scan may be compared, the first party owner-user's 300 sensitive personal data, and other data as required. The relationship between the SID 301 and its owner-user 300 may be one-to-one at any given time but, in some examples, it can be transferred to a new owner-user provided the 'biometric binding' is reset to the new user, e.g. by the third party agent 400. The SID 301 may have an anti-tamper mechanism which erases all sensitive data stored in volatile or non-volatile memory if any attempt is made to open the device case or otherwise compromise the integrity of the interior electronic components. Erased data includes but is not limited to the user-owner's biometric reference data, financial account numbers, or taxpayer identification numbers.

The SID 301 may be capable of communicating with the public internet through wireless networks (WiFi) and with nearby computers using short-range radio signals (Bluetooth/Near Field Communications-NFC) 311. Additionally, the device runs software that manages, during an identity verification event, simultaneous communication between a second party 600 website, internal network, or virtual private network and third party 500 infrastructure.

The ASID 401, may include many similar features to the SID 301, such as a network communication link, a GPS receiver and other components and behaviors described for the 'owner-user' SID 301, as well as a temporary software loading and unloading application that allows agents 400 of the third party 500 to bind specific devices to specific users.

In some examples, the ASID 401 may include:
1. a Global Positioning System (GPS) or equivalent navigation system capable of detecting the geographic coordinates of the device, and
2. software that manages, during the identity verification process, simultaneous communication between the SID 301 and the third party 500.

Figure 11:
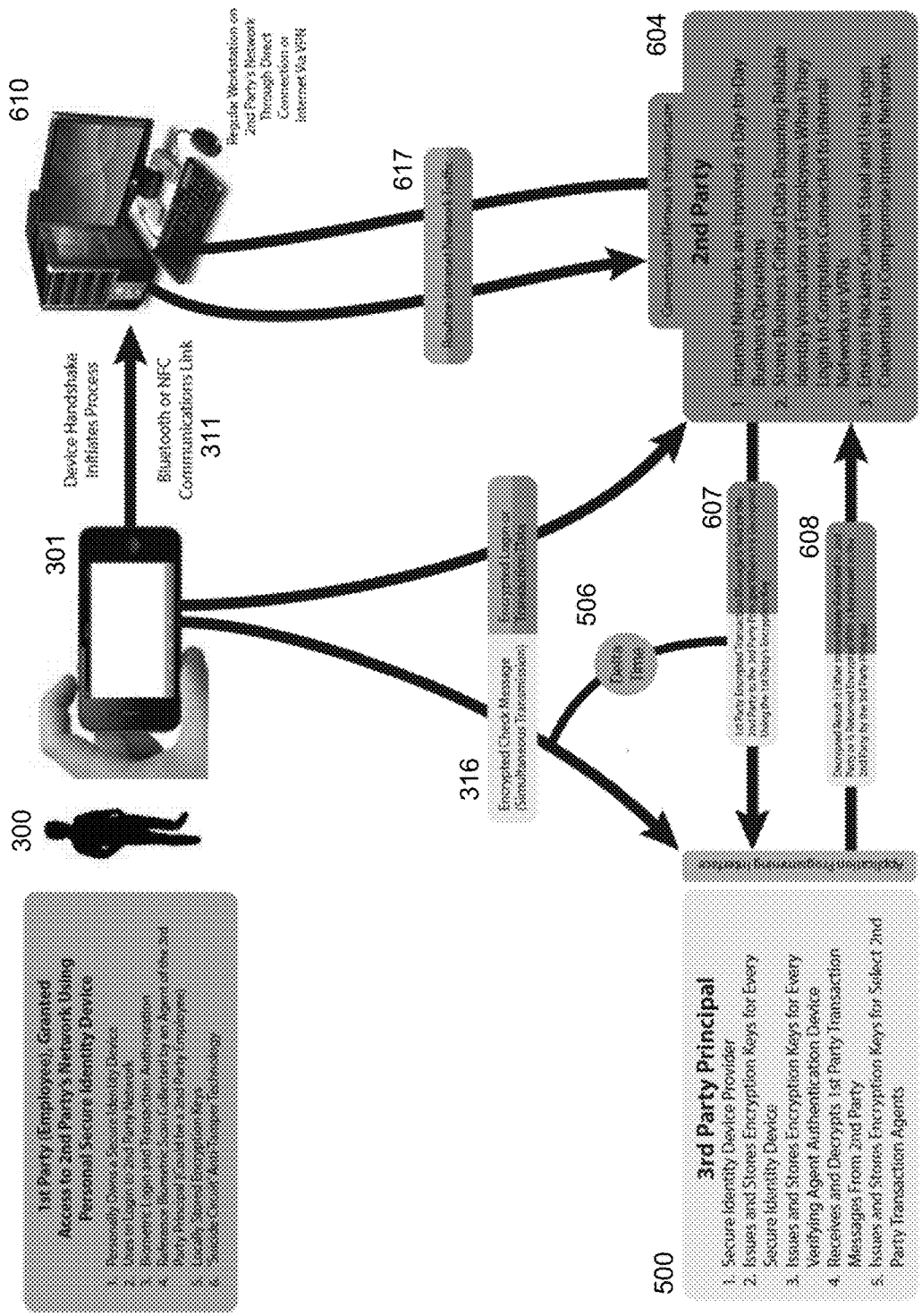
FIG. 11 illustrates an exemplary process for authenticating the user of a remote workstation using a secure identity user device according to aspects of the invention.

As shown in FIG. 11, in one usage scenario, the SID 301 may be issued to an employee of a second party company or government agency to use as a secure login device. The device may use short-range radio signals (Bluetooth/NFC) 311 to communicate with special software running on a nearby computer 610 connected to the second party's network 604, either directly or through a virtual private network.

The 'Second Party' 600 may be understood as the online entity with which the first party may interact in ways involving the exchange or transport of sensitive information through the internet; a private company or government office operating secure internal networks or virtual private networks (VPNs) that are reachable through or exposed to the public internet; or service providers in an electronic healthcare ecosystem that utilizes the public internet to facilitate interactions between patients and healthcare providers. Various second party infrastructure resources are represented in FIGS. 8 and 10-12 as resources 600, 602 and 604.

The 'Third Party Principal' 500 may be the operator of all infrastructure required to manage arbitrage between first and second parties, between third party agents and first parties, etc., and may be the principal distributor of the SID.

The 'Third Party Agent' 400 may be a human being that acts on behalf of the third party principal 500. A third party agent may be an employee of the third party principal 500, a contractor, an employee of a second party or any other human person with the authority to verify the identity of a owner-user in coordination with the third party principal 500. The third party agent 400 uses a ASID 401 to communicate with the SID 301 owned by or issued to the first party owner-user 300. A third party agent verifies the identity of a owner-user 300 only while in the physical presence of the owner-user 300. A Global Positioning System (GPS) or equivalent navigation system, incorporated into the ASID 401, ensures that the third party agent 400 can only authenticate a owner-user 300 when the SID 301 is within a specific but relatively small radius 401 from the third party ASID 401. The boundary 401 represents, for example, the radius from a fixed latitude and longitude (GPS fix) within which the both the ASID and the SID must remain during the SID initialization and user authentication procedures, such as described herein. Other boundary types and position determining means are also possible, e.g. using other near field communication links, etc. In some examples, the GPS fix may be determined by the third party 500 when the ASID 401 is issued to the agent 400. Before any registration or authorization procedure begins, a GPS receiver built into the ASID 401 may determine the current position of the ASID 401 and SID 301. The current GPS coordinates may be included in Composite Proof Messages 403 to the third party 500 and compared to the coordinates on record with the third party.

An 'Application Programming Interface' (API) 501 is provided by the third party 500 as the gateway through which SID 301, ASID 401, and second party computer systems 600, 602, 604, interact with the automated third party computer systems. In some examples, the API layer 501 may be accessible through the public internet using industry standard protocols (e.g. https).

Second parties second party computer systems 600, 602, 604, may use conventional websites (or specially secured networks, such as classified government networks) to communicate with SIDs 301 and/or intermediary systems like computer system 610, and may do so using internet standard communication protocols (e.g. https), unless the network requires other protocols. Any exchange 305 between parties, not involving sensitive data as discussed herein, may occur using these internet standard protocols without any involvement of the third party 500.

If an exchange between the first party and second party involves the transmission of sensitive data where the second party requires assurances of the personal (human) identity of the owner-user 300 that is using SID 301, messages 306 may be generated by the SID. One part of the message 306 may include the sensitive data along with additional information sent to the second party computer system (e.g. 600, 602, 604) in a structured unit comprising one or more of:
1. public serial number of the SID, unencrypted
2. sensitive data owned by the owner-user, encrypted with a first party SID encryption key
3. non-public first party SID serial number, encrypted with a first party SID encryption key
4. timestamp, encrypted with a first party SID encryption key
5. single use transaction code, encrypted with a first party SID encryption key At the same time the structured unit containing the owner-user's sensitive data in sent to the second party website or network, the SID sends to the API layer 501 a 'check message' containing one or more of:
1. public serial number of the SID, unencrypted
2. non-public SID serial number, encrypted with a first party SID key
3. timestamp, encrypted with a first party SID encryption key
4. single use transaction code (e.g. same code as in structured unit for second party), encrypted with a first party SID encryption key The check message may be used to validate the structured data unit sent by the second party to the third party API layer 501 though an internet (or other) link 607 between them.

Using a conventional, secure internet connection to the third party API 501, the second party computer system (600, 604) may transmit a structured data unit containing sensitive data encrypted with the first party SID encryption key to the third party 500 where it is decrypted and validated. The third party 500 may be the issuer of the first party encryption keys stored in the SID and may maintain copies of these keys. This enables the decryption and validation process and relieves the second party of the burden of storing (and potentially exposing to hackers) the sensitive data owned by the first party.

Once the structured data from 306 and 607 is decrypted and validated, the result may be either immediately returned to the second party computer system (e.g. 600, 604) or returned in encrypted form using a key issued to the second party by the third party, via message 608.

The third party 500 may record the time each message arrives at the API layer 501. In some examples, all validation messages come in pairs. One is the call made to the API 501 by the second party and the other is the check message sent directly to the third party 500 by the SID 301. Either message may arrive first. When the first of the two messages arrives, the third party software system listens for the second message. When both messages are received, the third party software compares the arrival times to calculate a delta time 506, ensuring that they are separated by no more than a specific but small time span.

By adding this additional layer of timestamp validation, hackers will be less likely to compromise the system.

This same timing procedure may be applied to the authorization process involving authorization message 412 and composite proof messages 403 for Device Initialization and User Identity Verification Procedures described further below with respect to FIG. 9.

Once the third party agent 400 has successfully verified the true identity of the owner-user 300 and initialized the SID 301 by scanning with and storing into the memory of the SID 301 the owner-user's biometric reference data, the ASID 401 sends an electronic message to both the SID 301 via a short range radio link 311 and, simultaneously, to the third party 500. This 'authorization proof message' 412 may contains the following information:
1. public serial number of the ASID 401, unencrypted
2. non-public third party ASID serial number, encrypted with a third party ASID encryption key
3. third party ASID 301 GPS coordinates, encrypted with a third party ASID encryption key
4. single use transaction code, encrypted with a third party SID encryption key
5. timestamp, encrypted with a third party ASID encryption key Once the SID 301 receives an authorization proof message 312, it is included in a 'composite proof message' 403 which is sent to the third party 500 at nearly the same time (within some very small tolerance) that the ASID 401 sends the authorization proof message to the third party 500. The composite message may contain the following information:
1. public serial number of the SID 301, unencrypted
2. non-public first party SID serial number, encrypted with a first party SID encryption key
3. the (entire) authorization proof message 412, encrypted with a first party SID encryption key
4. single use transaction code (same code as authorization proof message 412), encrypted with a first party SID encryption key
5. timestamp, encrypted with a first party SID encryption key It some examples, in the composite proof message 403, the authorization proof message 412 may be encrypted twice, once with a third party ASID encryption key and then a second time as part of the composite proof message where it is encrypted again with a first party SID encryption key.

When the third party 500 receives both the third party ASID authorization proof message 412 and the first party SID composite proof message 403, the third party 500 may send a response message 514 back to the third party ASID 401 containing.
1. authorization response code, encrypted with a third party ASID encryption key
2. timestamp, encrypted with a third party ASID encryption key The third party ASID response message 514 is decrypted by software running on the ASID 401. The third party ASID software may use the short range radio link with the SID 301 to check to see if the SID 301 has received a counterpart response message 515 from the third party 500. When both response messages are received, the software running on the third party ASID 401 compares the authorization response codes from both messages to ensure they are the same. It also checks that the timestamps differ by no more than a specific but small time span.

When the third party 500 receives both the third party ASID authorization proof message 412 and the first party SID composite proof message 403, the third party 500 may send a response message 515 back to the SID 301 containing:
1. authorization response code, encrypted with a first party SID encryption key
2. timestamp, encrypted with a first party SID encryption key The first party SID response message 515 is decrypted by software running on the SID 301. The first party SID software allows the third party ASID 401 to read the values of the decrypted response message authorization response code and timestamp.

Figure 10:
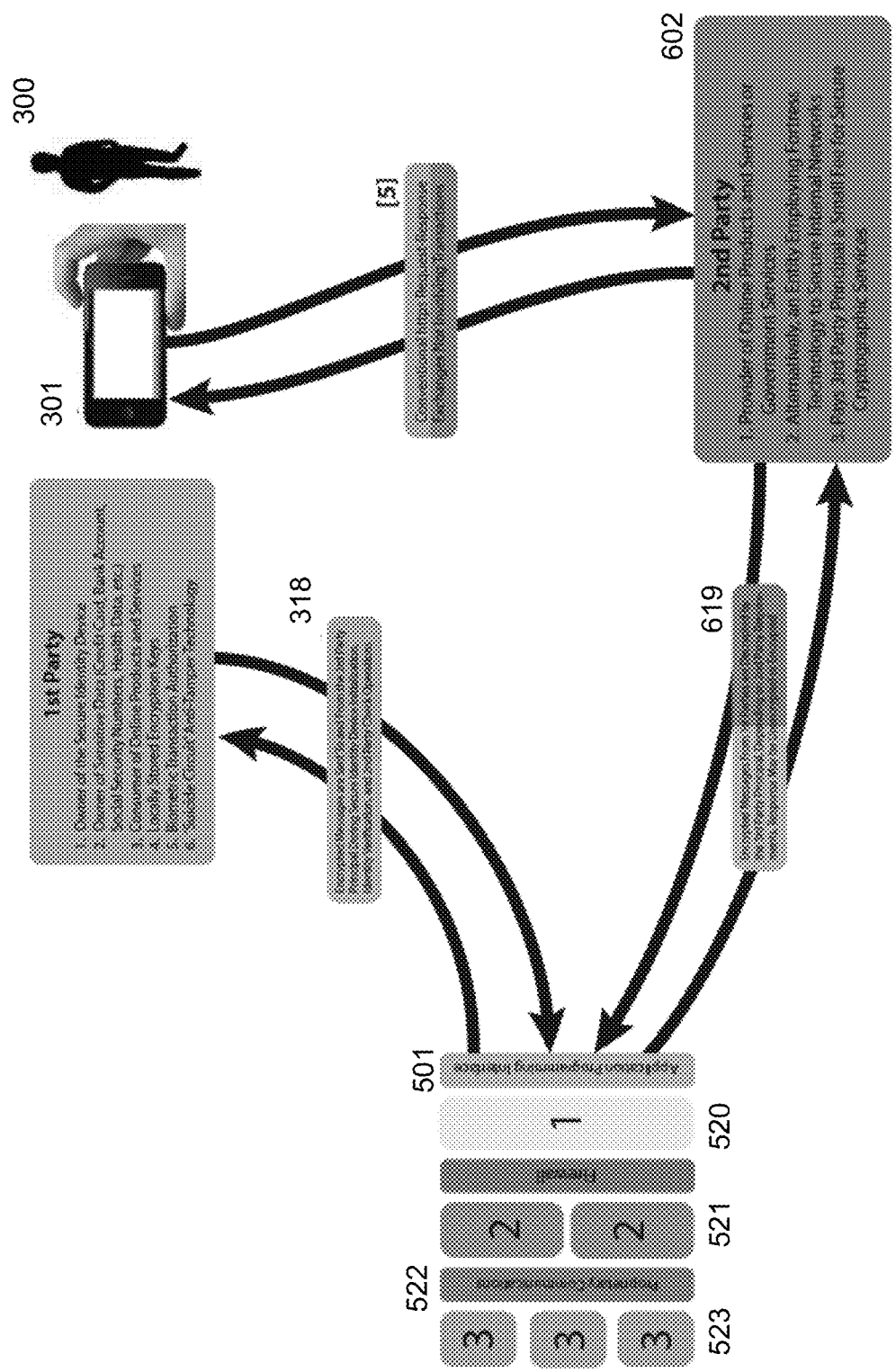
FIG. 10 illustrates an exemplary process for data handling and cryptography procedures using a secure identity user device according to aspects of the invention.

FIG. 10 shows additional details regarding Secure Identity Device Data Handling and Cryptography Procedures.

As shown in FIG. 10 the 'First Party' consists of a human being (person) 300 and SID 301. Communications to and from SID 301 and the third party API 501 (and other third party infrastructure 520-523) may occur via exchange 318 during the following operations:
1. third party ASID 401 initialization
2. SID 301 initialization and owner-user 300 identity verification by a third party agent 400
3. identity verification events when sensitive owner-user data or second party login or transaction data is transported across secure or unsecure internet connections Communications to and from a second party and the third party API 501 (and other third Party infrastructure 520-523) may occur via exchange 619 during the following operations:
1. second party requests for first party SID data unit decryption and first party owner-user identity verification
2. third party responses to second party requests for first party SID data unit decryption and first party owner-user identity verification (response may or may not be encrypted with a key issued to the second party 602 by the third party 500)

The technology infrastructure operated by the third party 500 built in layers with each layer removing the cryptographic operations farther away from the public internet and exposure to hackers. Layer 520 may include a collection of servers running the third party APIs 501 which handle communications to and from SIDs 301, ASIDs 401, and second party computer systems 600, 602, 604. This layer is naturally exposed to the public internet through public-facing but encrypted standard internet protocols (e.g. https).

A second layer 521 of computer servers run software that manages all business logic required to deliver third party 500 services rendered to first and second parties. Computer servers in this layer may be protected by a firewall which allows only network traffic to and from the public-facing servers in the 1$^{st}$ layer 520 to pass through. The layer 521 network may be completely separate from all other internal computer networks operated by the third party 500. This means that computers in the layer 521 network are not accessible from computers in other third party 500 internal networks such as those used for routine corporate operations (e.g. email, human resources, accounting, etc.).

The layer 521 servers run software that manages communications to and from specially designed computers 523 that handle all cryptographic operations including message decryption and encryption and generation of new encryption keys. This communication occurs through a non-standard, proprietary pathway designed to allow automated transmission of messages while isolating the layer 523 cryptographic computers from direct exposure to the layer 1 servers 520 and the public internet.

The most secure part of the third party infrastructure 500 is layer 523 which is comprised of specially built computers running a custom-built operating system designed to allow an extremely narrow range of communications into and out of the computers. These computers execute all cryptographic operations including message decryption and encryption and generation of new encryption keys. They are not connected to any conventional computer network and are separated from all other computers in all other networks by an 'air gap' except for the proprietary connections 522 to the layer 521 servers.

FIG. 11 depicts additional details regarding a Personally Owned Secure Identity Device-Secure Login Variant.

When a SID 301 is used by a owner-user 300 to log in to a second party workstation 610 or to send sensitive data to the second party system 604, an initial handshake may be implemented between the SID and the workstation 610 via communication link 311. The user identity verification data, along with additional information, may be sent as shown in 316. A structured communication unit may be sent to the second party including:
 1. public serial number of the SID 301, unencrypted
 2. log in or sensitive data required by the second party 604, encrypted with a first party SID encryption key
 3. non-public first party SID 301 serial number, encrypted with a first party SID encryption key
 4. timestamp, encrypted with a first party SID encryption key
 5. single use transaction code, encrypted with a first party SID encryption key As also shown in 316, at the same time the SID 301 sends the structured unit containing sensitive data to the second party server infrastructure 604, the SID 301 sends to the third party API 501 a 'check message' containing:
 1. public serial number of the SID 301, unencrypted
 2. non-public first party SID 301 serial number, encrypted with a first party SID encryption key
 3. timestamp, encrypted with a first party SID encryption key
 4. single use transaction code (same code as in structured unit for second party), encrypted with a first party SID encryption key The check message is used to validate the structured data unit sent by the second party to the third party API 501 through the internet link 607 between them.

After the SID exchange is successfully used to verify the true identity of the owner-user 300 (and the second party server infrastructure 604 and/or the workstation 610 confirm that the SID 301 is communicating with workstation 610 via handshake or other processes) routine intranet network exchanges between the second party server infrastructure 604 and the workstation 610 used by the owner-user continue until the first party owner-user logs off of the workstation 610 or until the second party server infrastructure 604 requests that the owner-user 300 use the SID 301 to re-verify the owner-use's identity.

Figure 12:
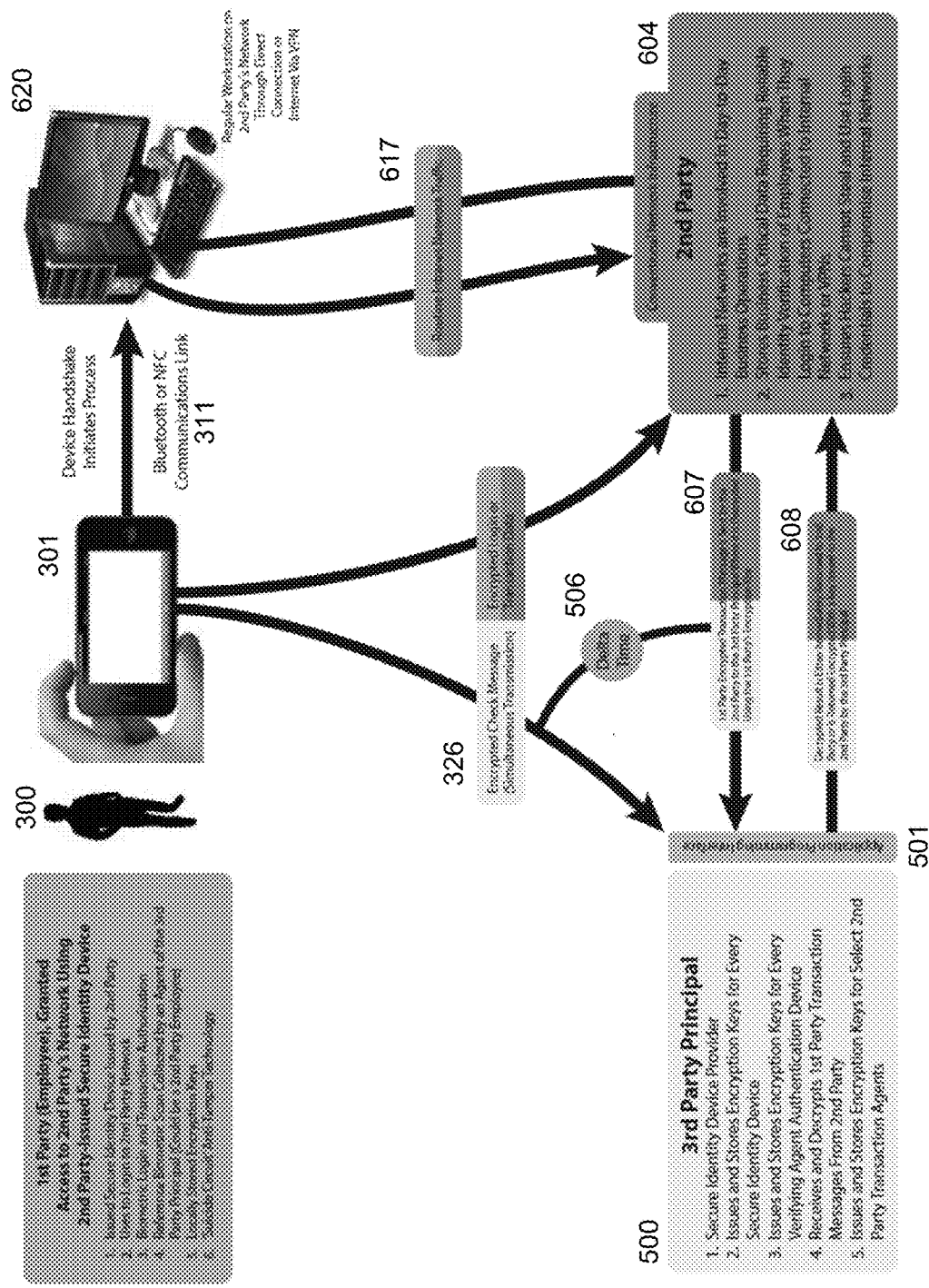
FIG. 12 illustrates an exemplary process for authenticating the user of a remote workstation using a secure identity user device that is issued by a second party service provider according to aspects of the invention.

FIG. 12 depicts additional details regarding a second party-issued Secure Identity Device-Secure Login Variant.

In one usage scenario, the SID 301 may be issued to an employee of a second party company or government agency to use as a secure login device. The SID 301 uses short-range radio signals (Bluetooth/NFC) [11] to communicate with special software running on a nearby computer 620 connected to the second party network 604, either directly or through a virtual private network.

A second party workstation 620 is used to enable user 300 to access a second party 604 internal network or virtual private network. The workstation 620 may have a short-range radio communications capability (Bluetooth or NFC) 311, so that data may be exchanged between SID and the workstation 620 or any computer that serves as an access point to the second party 604 internet network or virtual private network.

Using a conventional, secure internet connection to the third party API 501, the second party may transmit a structured data message 607 containing sensitive data encrypted with the first party SID encryption key to the third party 500 where it is decrypted and validated. The party 500 may be the issuer of the first party SID encryption keys and may maintain copies of these keys. This enables the decryption and validation process and relieves the second party 604 of the burden of storing the sensitive data owned by the first party, potentially exposing it to hackers.

Once the structured data message 607 is decrypted and validated by the third party 500, the result may be either immediately returned to second party 604 or returned in encrypted form using a key issued to the second party 604 by the third party 500, via message 608.

The process may use timestamp delta time 506 validation as previously discussed.

When a SID 301 is used by an owner-user 300 to log in to a second party workstation 620 or to send sensitive data to the second party system 604, an initial handshake may be implemented between the SID and the workstation 620 via communication link 311. The user identity verification data, along with additional information, may be sent as shown in 326. A structured communication unit may be sent to the second party including:
 1. public serial number of the SID 301, unencrypted
 2. log in or sensitive data required by the second party 604, encrypted with a first party SID encryption key
 3. non-public first party SID 301 serial number, encrypted with a first party SID encryption key
 4. timestamp, encrypted with a first party SID encryption key
 5. single use transaction code, encrypted with a first party SID encryption key As also shown in 326, at the same time the SID 301 sends the structured unit containing sensitive data to the second party server infrastructure 604, the SID 301 sends to the third party API 501 a 'check message' containing:
 1. public serial number of the SID 301, unencrypted
 2. non-public first party SID 301 serial number, encrypted with a first party SID encryption key 3. timestamp, encrypted with a first party SID encryption key
4. single use transaction code (same code as in structured unit for second party), encrypted with a first party SID encryption key The check message is used to validate the structured data unit sent by the second party to the third party API 501 through the internet link 607 between them. It should be noted that, in this case, since the second party issued the SID 301 to the user 300, there may be additional protocols implemented between the SID 301 and the workstation 620 to confirm that the device is authenticated with the second party 604.

After the SID exchange is successfully used to verify the true identity of the owner-user 300 (and the second party server infrastructure 604 and/or the workstation 620 confirm that the SID 301 is communicating with workstation 620 via handshake or other processes) routine intranet network exchanges between the second party server infrastructure 604 and the workstation 620 used by the owner-user continue until the first party owner-user logs off of the workstation 620 or until the second party server infrastructure 604 requests that the owner-user 300 use the SID 301 to re-verify the owner-use's identity.

Various aspects of the present disclosure are further described through the following three use cases. The scenario involves a man named John Smith, an employee of a defense contractor that requires the highest possible security for its internal networks. Mr. Smith is also a consumer who wants to handle his banking online and who makes purchases from online retailers. In each use case, John Smith uses his personally owned smartphone which is equipped with certain security features including a biometric reader. The use cases progress through Mr. Smith's work day, each showing a different way he uses the same smartphone device to verify his identity.

This is possible because the independent third party acts as an arbitrator for both the first and second parties. In our use cases, Mr. Smith is the first party and his defense contractor employer is the second party. The independent third party identity management service acts in a way similar to a referee in sports match.

Figure 13:
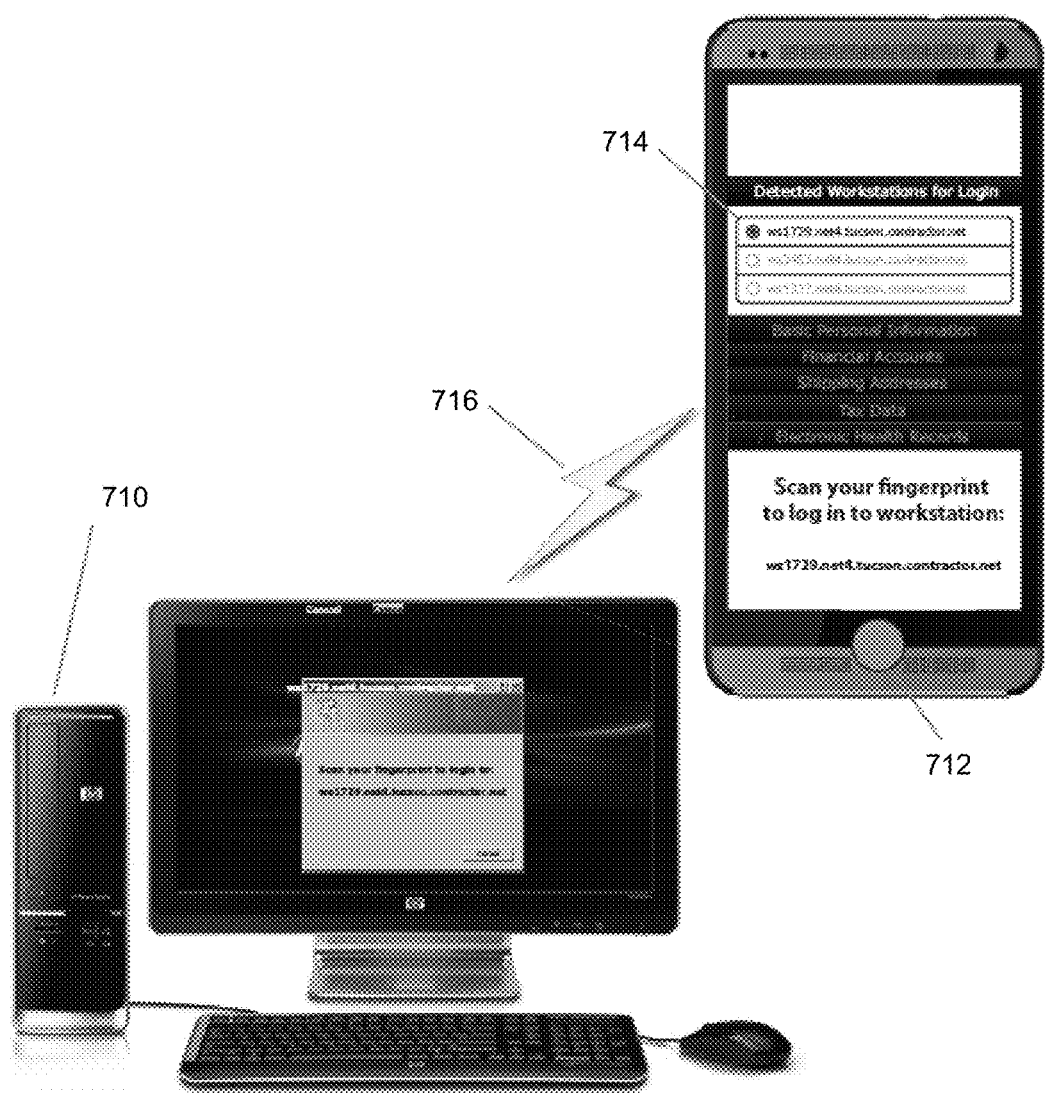
FIG. 13 illustrates an exemplary use case in which a secure identity user device is used to log into an employee's work-related network according to aspects of the invention.

FIG. 13 shows a first use case of a defense contractor employee login to a company network.

Mr. Smith, arrives at his office and turns on his company computer workstation 710. He brings his personal smartphone 712 to within a few feet of his workstation 710. The workstation's short range radio detects the presence of the smartphone 712 and cause display of a prompt (via communications link 716) asking John to scan his fingerprint (or any other biometric identifier) to log in. The smartphone 712 detects all workstations within range and displays a list in a mobile app 714. In this example, 3 workstations are detected but the service knows that John Smith is only authorized to access the computer identified as 'ws1729.net4.tucson.contractor.net'. However, in other examples, the user may be able select between various available and authorized networks. To gain access to the workstation 710, John simply scans his fingerprint using his smartphone's biometric reader. John's smartphone 712 was initialized by representative from the defense contractor's human resources department using procedures similar to those previously described.

Figure 14:
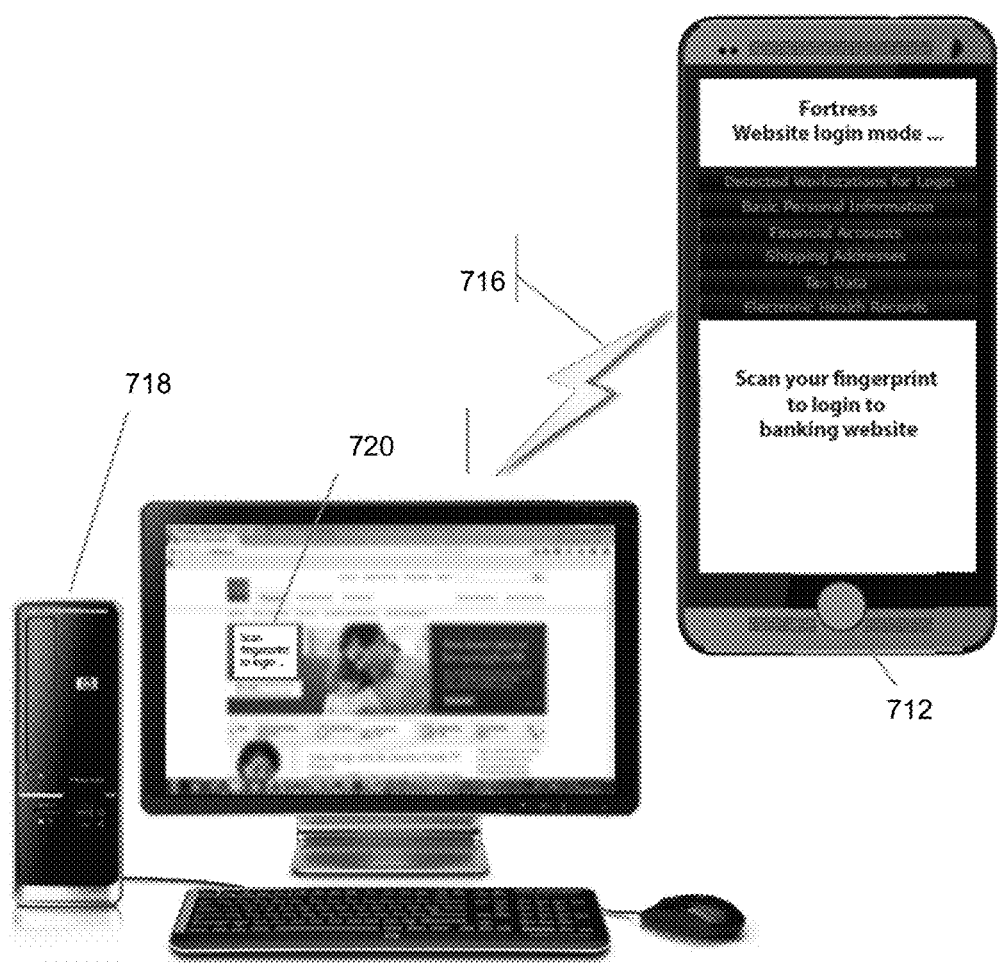
FIG. 14 illustrates an exemplary use case in which the secure identity user device from FIG. 13 is also used to log into an online banking website according to aspects of the invention.

FIG. 14 shows a second use case of a banking customer login to a bank website After John logs out of his company workstation, he goes home and decides to check his bank account. In an internet browser window on home computer 718, he types in the address of his bank's website and navigates to the online banking login page. John brings his personal smartphone 712 to within a few feet of his home computer and the computer's short range radio detects the presence of the smartphone 712. The computer 718 (or third party message) then causes the smartphone 712 and/or computer 718 to display a prompt asking John to scan his fingerprint to log in 720.

Recall that in Use Case 1, John's smartphone 712 was initialized by a human resources representative at his defense contractor's offices. Because the online bank trusts the validity of the defense contractor's in-person, real world identity verification, it trusts the identity confirmed by his personal smartphone 712. This means that John can universally verify his identity at any website accepting the credential unless his smartphone 712 is lost, destroyed, or tampered with.

Figure 15:
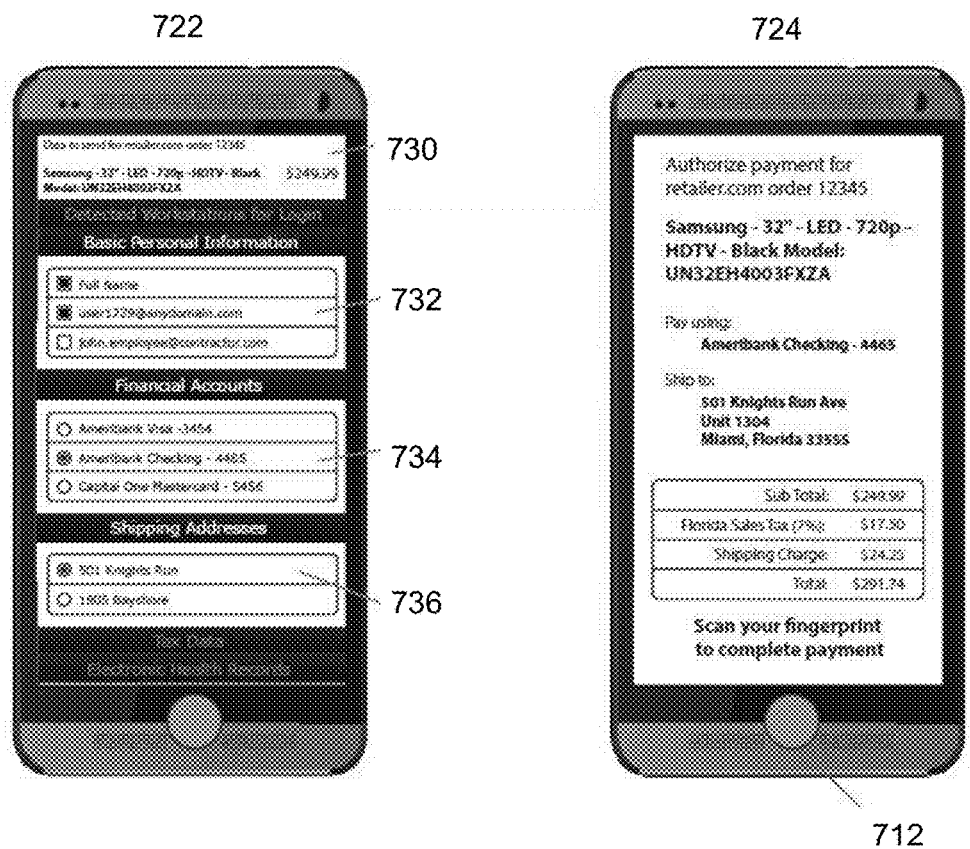
FIG. 15 illustrates an exemplary use case in which the secure identity user device from FIG. 13 is also used to make an online purchase according to aspects of the invention.

FIG. 15 shows a third use case of a consumer making an online purchase including authorizing payment for purchase from an online retailer.

Once he has checked his online bank account, John decides to search for and buy a new television set. Using his smartphone's web browser, he searches the web for the best price. He navigates to an online retailer he has never visited before and, because they offer the best price, he selects the television make and model he wants and navigates to the website's check out page 722. The web application communicates with the smartphone's identity verification software through the browser to confirm his identity. The identity verification software presents John with the total price, including shipping and sales tax and then asks him to select a payment account 734, shipping address 736, email address 732, etc. It then asks John to scan his fingerprint to authorize the payment in authorization screen 724. As in Use Case 2, the online retailer trusts the identity verification because it trusts both the second party—John's defense contractor employer—and the third party identity management service.

This use case illustrates two benefits for ecommerce.

First, John does not have to enter any data into the website even if, as in this example, this is the first time he has visited the online retailer. All data necessary to complete the purchase is stored inside John's smartphone and is sent in encrypted form to the retailer after a successful biometric scan.

Secondly, hacker attacks on the online retailer are stopped because the website no longer needs to store large numbers of credit card accounts and other sensitive information. The present invention eliminates the need for any online retailer to store any sensitive information in centralized databases because John's personal data, including his fingerprint reference data, is stored in a tamper-resistant smartphone. Online retailers, online tax filing services, and other handlers of sensitive personal data use the data on an as-needed basis. Data is dispersed across millions of devices, removing the primary reason hackers target retailers and other web-based businesses. For example, the encrypted data provided by John may only be decrypted by a third party service that has his specific first party SID keys.

The networks described herein can connect various wired, optical, electronic and other known networks to exchange information among, for example, servers, computers, mobile device(s), picocell network devices, mobile computer(s), and any other devices with similar functionality. The above-described devices and materials will be familiar to those of skill in the computer hardware and software arts and need not be individually or exhaustively depicted to be understood by those of skill in the art. The hardware elements described above may be configured to act as one or more modules for performing the operations described above.

In addition, embodiments of the present invention further include computer-readable storage media that include program instructions for performing various computer-implemented operations as described herein. Unless otherwise specified, the media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as flash drives, hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The description given above is merely illustrative and is not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments.

What is claimed is:

1. A computer-implemented method of providing third party network user authentication for a first party user attempting to access a network service provided by a second party, said method comprising, at a third party authentication server:
    registering a network service;
    registering a user device with a first user;
    generating a first encryption key associated with the user device;
    receiving a first encrypted check message from the user device;
    generating timestamp information for the first encrypted check message;
    receiving a second encrypted check message from the network service;
    generating timestamp information for the second encrypted check message;
    comparing the timestamp information for the first encrypted check message and the timestamp information for the second encrypted check message;
    decrypting the first check message and the second check message using the first encryption key;
    authorizing at least one of a network access or a network transaction between the first user and the network service based at least in part on a determination that a difference between the timestamp information for the first encrypted check message and the timestamp information for the second encrypted check message is less than a first threshold, and a comparison of the decrypted information from the first check message and the second check message; and
    sending an authorization message to the network service based on said authorizing,
    wherein authorizing the at least one of a network access or a network transaction between the first user and the network service is further based at least in part on a determination that a time difference between timestamps included in the received first encrypted check message and the received second encrypted check message is less than a second threshold.

2. The method of claim 1, wherein registering the user device with the first user includes:
    acquiring biometric data of the user via an agent of the third party;
    storing the biometric data on the user device as biometric reference data using computer instructions and an encryption key provided by the third party;
    reacquiring the user's biometric data via a test scan using a biometric scanner of the user device;
    verifying that the biometric reference data is accurately stored on the user device by comparing the test scan to the biometric reference data; and
    causing the user device to delete said computer instructions based on the verification that the biometric reference data is accurately stored on the user device.

3. The method of claim 1, wherein the network service includes a computer network of the second party, and the second encrypted check message is based at least in part on a communication between the user device and a workstation connected to the computer network.

4. The method of claim 1, wherein the network service includes a network banking website, and the second encrypted check message is based at least in part on a communication between the user device and a workstation connected to the network banking website.

5. The method of claim 1, wherein the network service includes an online purchase, and the second encrypted check message is based at least in part on confirming the identity of a person operating the user device.

6. The method of claim 1, wherein:
    registering the user device with the first user includes storing biometric data of the first user on the user device as biometric reference data using computer instructions provided by the third party;
    the first check message is sent from the user device based at least in part on a comparison between current biometric data and the biometric reference data; and
    the second check message is sent based at least in part on the comparison between current biometric data and the biometric reference data.

7. The method of claim 6, wherein the user's biometric data is not communicated to, or maintained by, the network service or the third party.

8. The method of claim 1, wherein:
    registering the user device with the first user includes configuring a one-time password service associating the first user and the user device using computer instructions provided by the third party, at least one parameter used by one-time password service being stored locally on the user device and inaccessible by the third party;
    the first check message is sent from the user device based at least in part on an identity check performed via the user device using the one-time password service; and
    the second check message is sent based at least in part on the identity check.

9. The method of claim 1, wherein the second check message is based at least in part on the network service confirming that the user device is authorized to access the network service.

10. A system for providing third party user authentication for a first party user attempting to access a network service provided by a second party, said system comprising:
a computer processor;
a network interface; and
memory including instructions configured to:
register a network service via the network interface;
register a user device with a first user via the network interface;
generate a first encryption key associated with the user device;
receive a first encrypted check message from the user device via the network interface;
generate timestamp information for the first encrypted check message;
receive a second encrypted check message from the network service via the network interface;
generate timestamp information for the second encrypted check message;
compare the timestamp information for the first encrypted check message and the timestamp information for the second encrypted check message;
decrypt the first check message and the second check message using the first encryption key;
authorize at least one of a network access or a network transaction between the first user and the network service based at least in part on (a) a determination that a difference between the timestamp information for the first encrypted check message and the timestamp information for the second encrypted check message is less than a first threshold, and (b) a comparison of the decrypted information from the first check message and the second check message; and
send an authorization message to the network service via the network interface based on said authorizing,
wherein authorizing the at least one of a network access or a network transaction between the first user and the network service is further based at least in part on a determination that a time difference between timestamps included in the received first encrypted check message and the received second encrypted check message is less than a second threshold.

11. The system of claim 10, wherein registering the user device with the first user includes:
acquiring biometric data of the user via an agent of the third party;
storing the biometric data on the user device as biometric reference data using computer instructions and an encryption key provided by the third party;
reacquiring the user's biometric data via a test scan using a biometric scanner of the user device;
verifying that the biometric reference data is accurately stored on the user device by comparing the test scan to the biometric reference data; and
causing the user device to delete said computer instructions based on the verification that the biometric reference data is accurately stored on the user device.

12. The system of claim 10, wherein the network service includes a computer network of the second party, and the second encrypted check message is based at least in part on a communication between the user device and a workstation connected to the computer network.

13. The system of claim 10, wherein the network service includes a network banking website, and the second encrypted check message is based at least in part on a communication between the user device and a workstation connected to the network banking website.

14. The system of claim 10, wherein the network service includes an online purchase, and the second encrypted check message is based at least in part on confirming the identity of a person operating the user device.

15. The system of claim 10, wherein:
registering the user device with the first user includes storing biometric data of the first user on the user device as biometric reference data using computer instructions provided by the third party;
the first check message is sent from the user device based at least in part on a comparison between current biometric data and the biometric reference data; and
the second check message is sent based at least in part on the comparison between current biometric data and the biometric reference data.

16. The system of claim 15, wherein the user's biometric data is not communicated to, or maintained by, the network service or the third party.

17. The system of claim 10, wherein:
registering the user device with the first user includes configuring a one-time password service associating the first user and the user device using computer instructions provided by the third party, at least one parameter used by one-time password service being stored locally on the user device and inaccessible by the third party;
the first check message is sent from the user device based at least in part on an identity check performed via the user device using the one-time password service; and
the second check message is sent based at least in part on the identity check.

18. The system of claim 10, wherein the second check message is based at least in part on the network service confirming that the user device is authorized to access the network service.

* * * * *